July 14, 1953　　　M. H. FRANK　　　2,645,135
TRANSMISSION AND CONTROL
Filed April 18, 1950　　　　　　　15 Sheets-Sheet 1
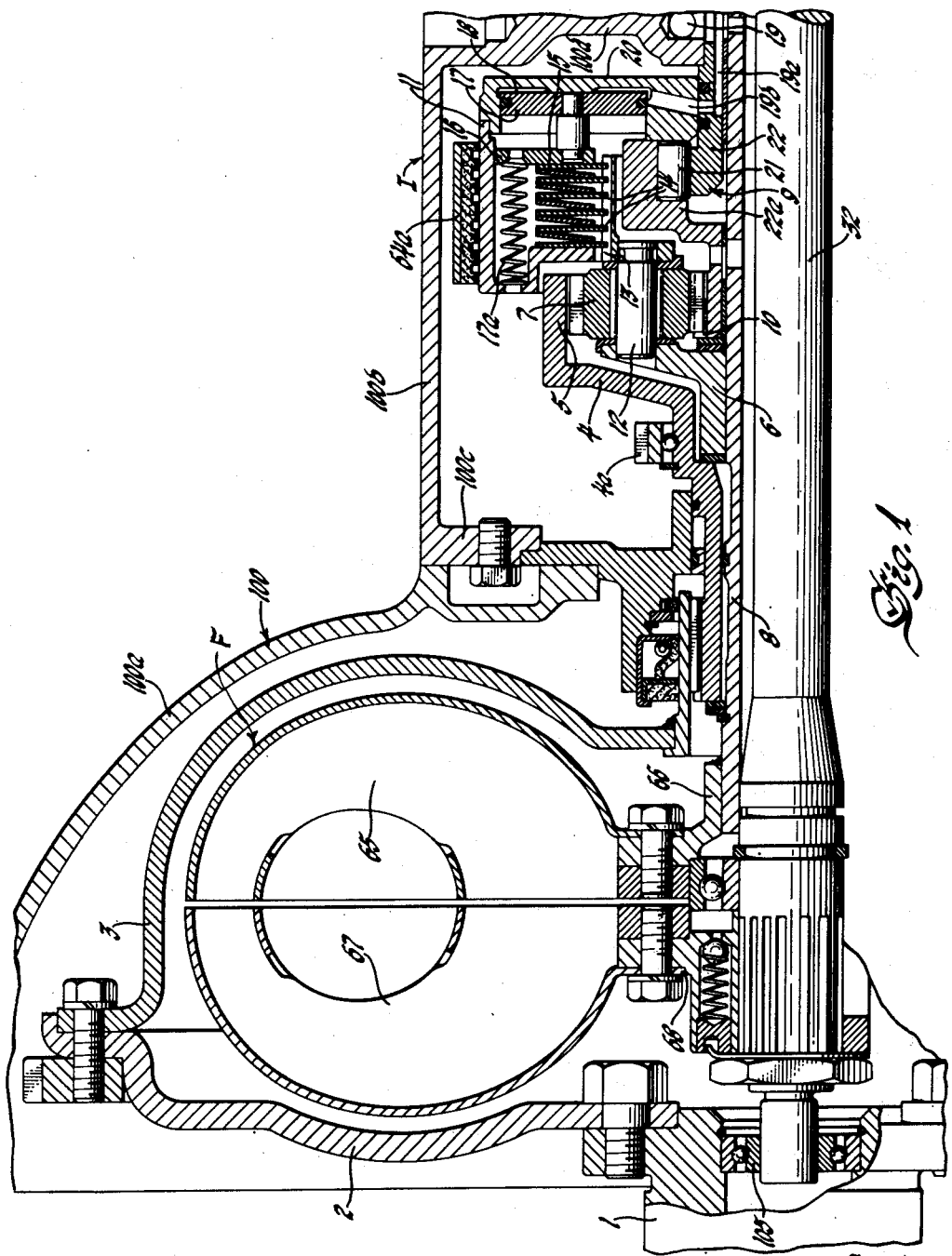
Inventor
Mark H. Frank
By Willits, Hehwig & Baillio
Attorneys

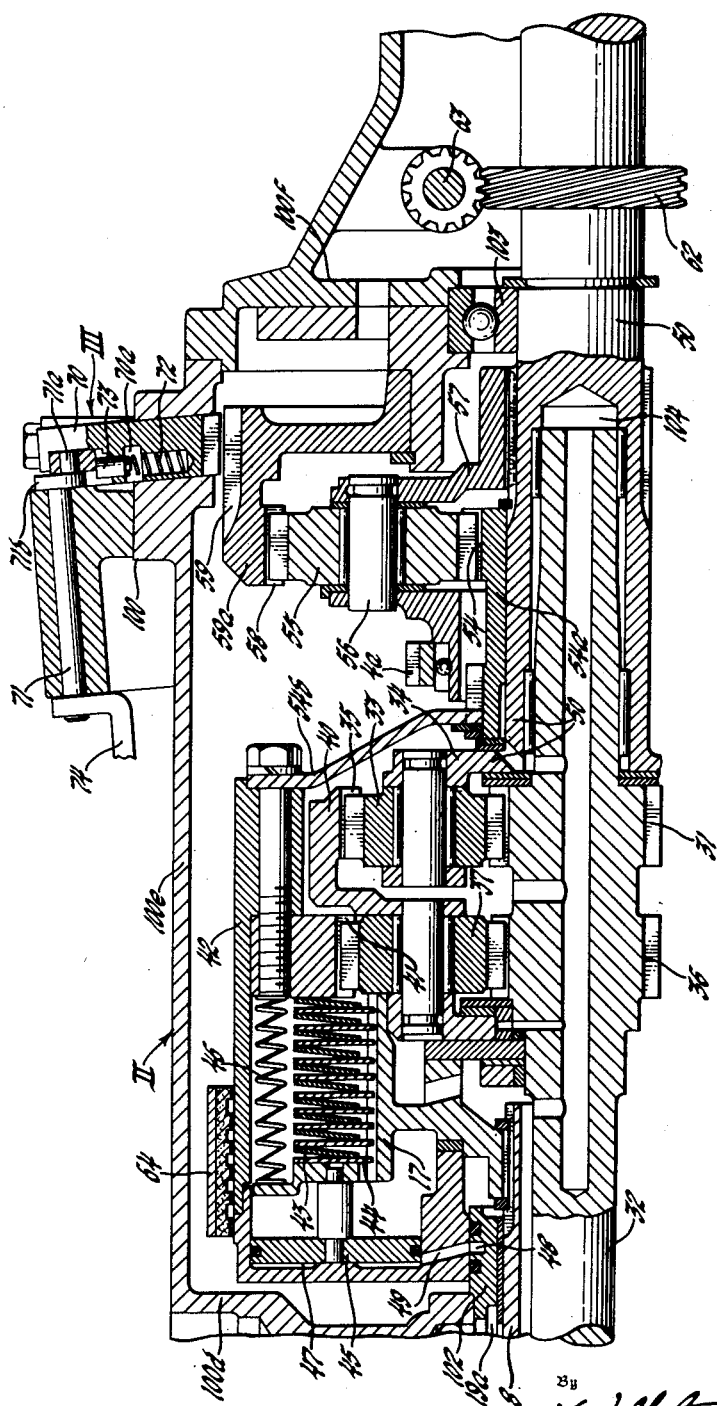

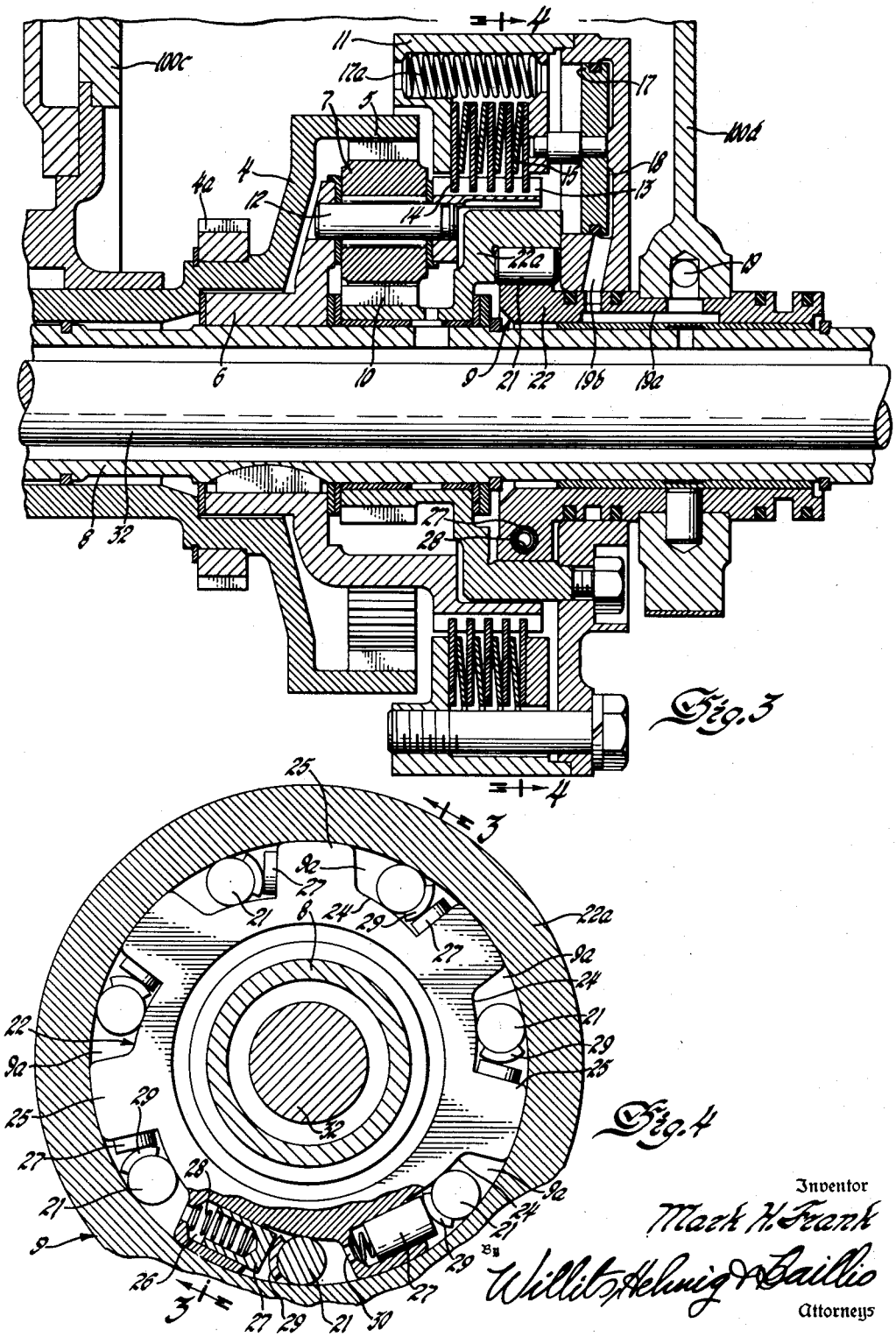

July 14, 1953 M. H. FRANK 2,645,135
TRANSMISSION AND CONTROL
Filed April 18, 1950 15 Sheets-Sheet 4
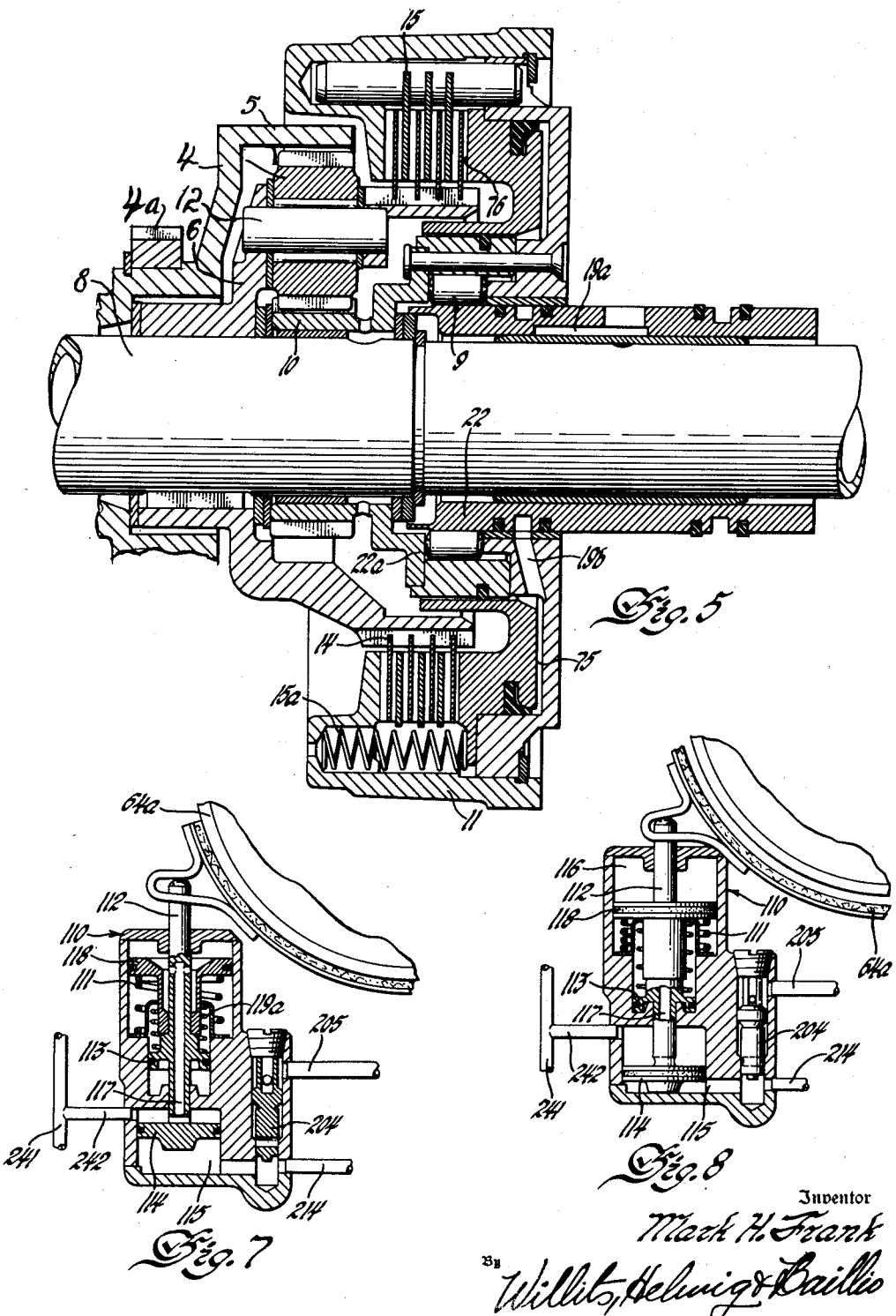

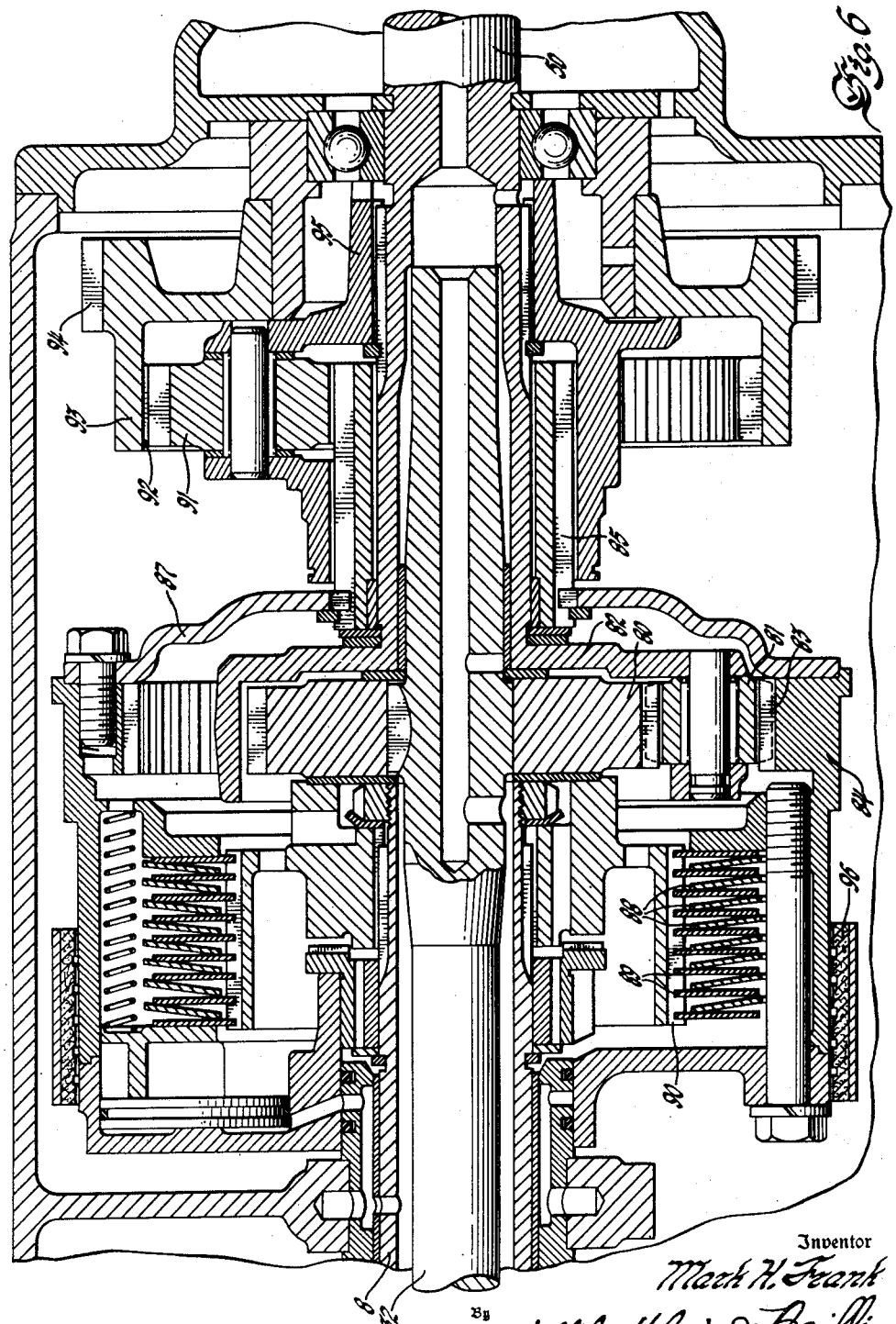

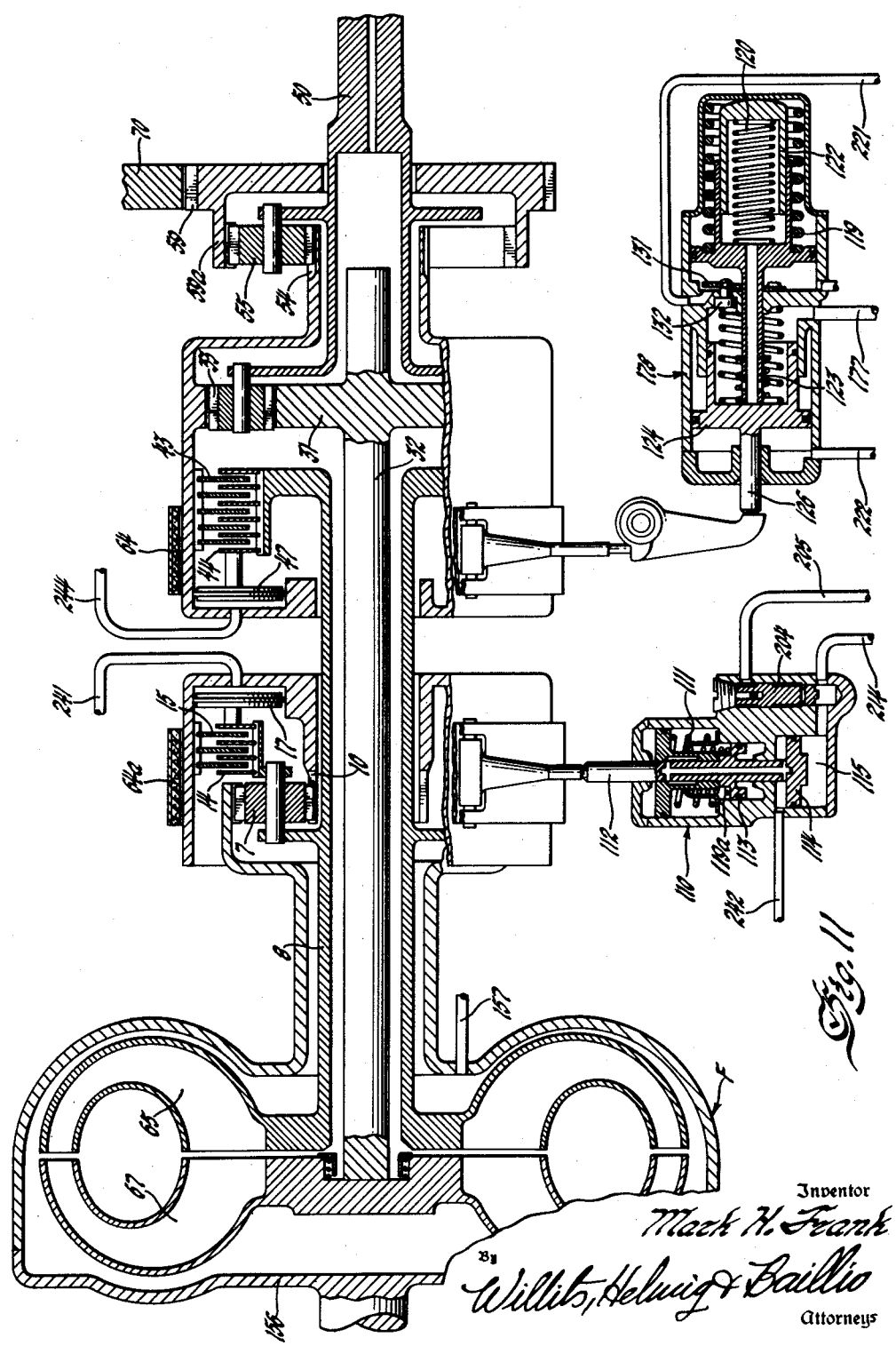

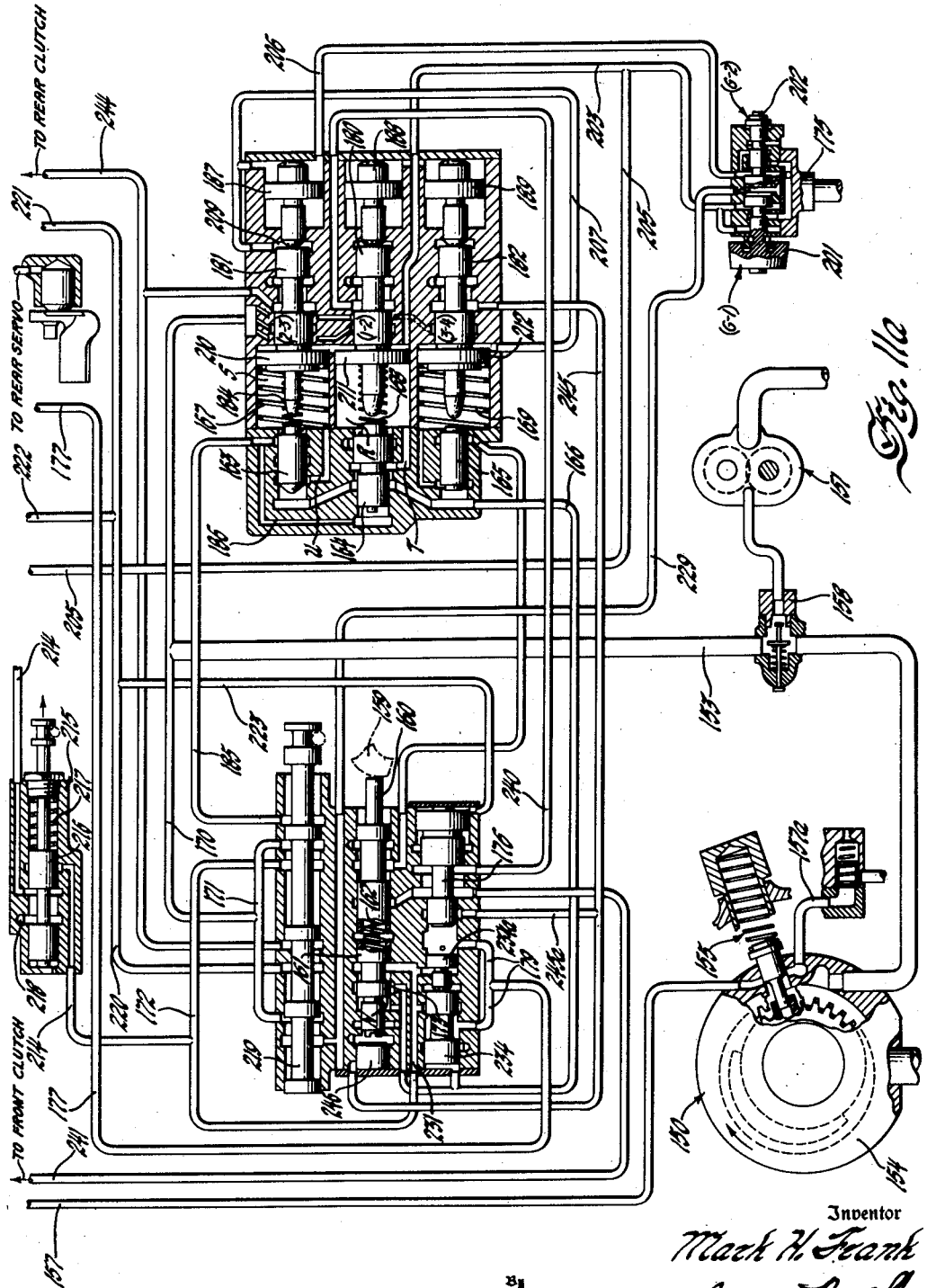

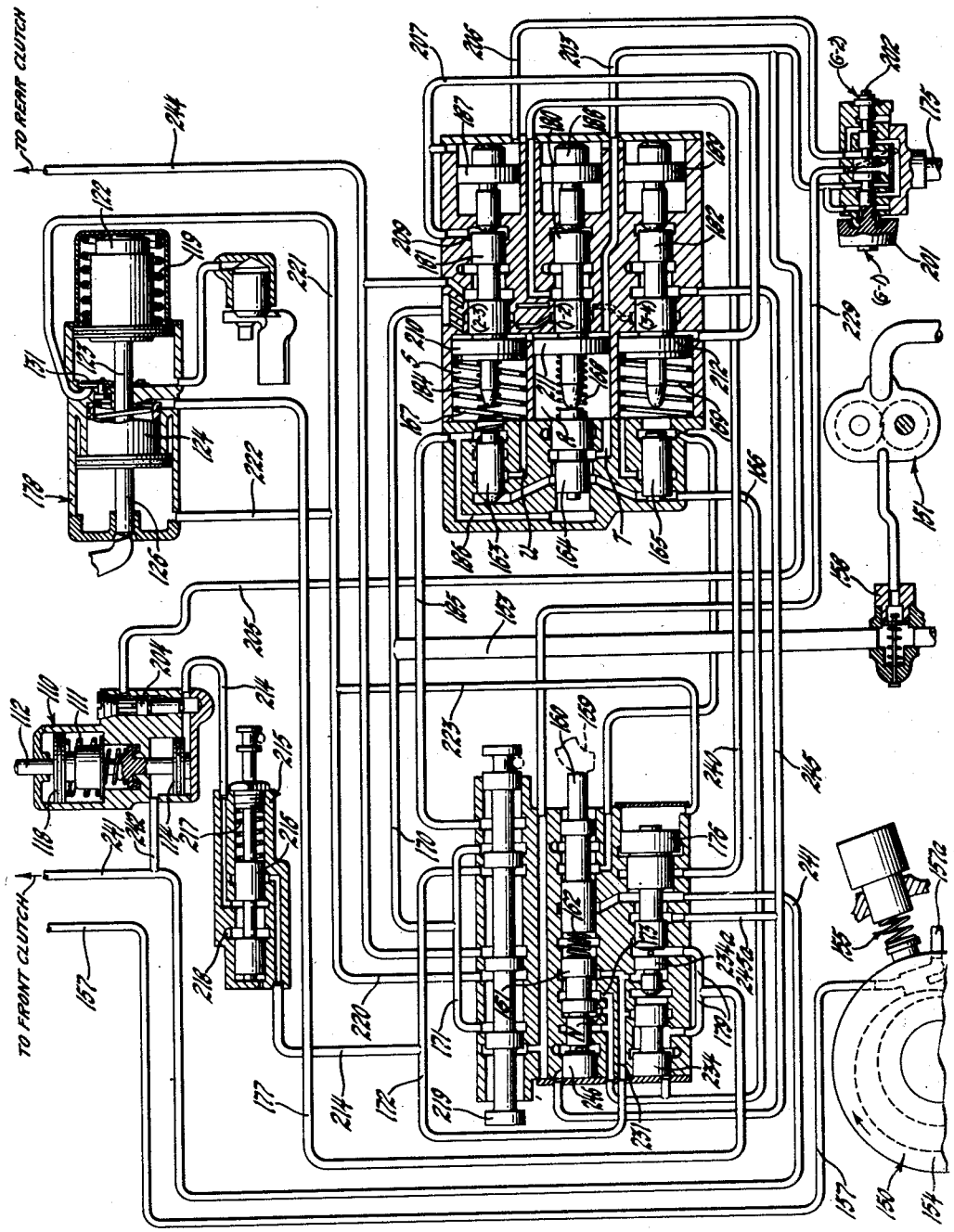

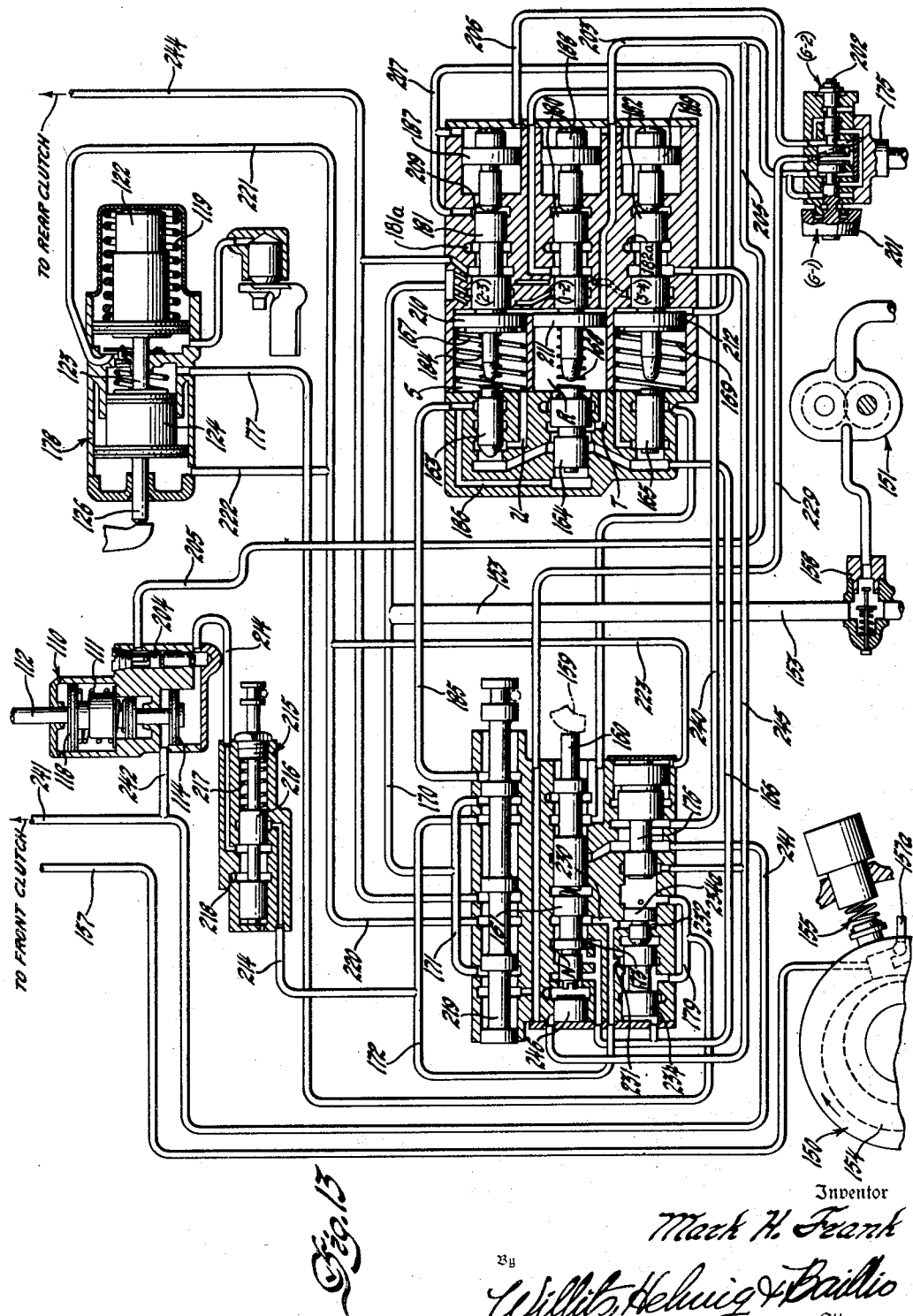

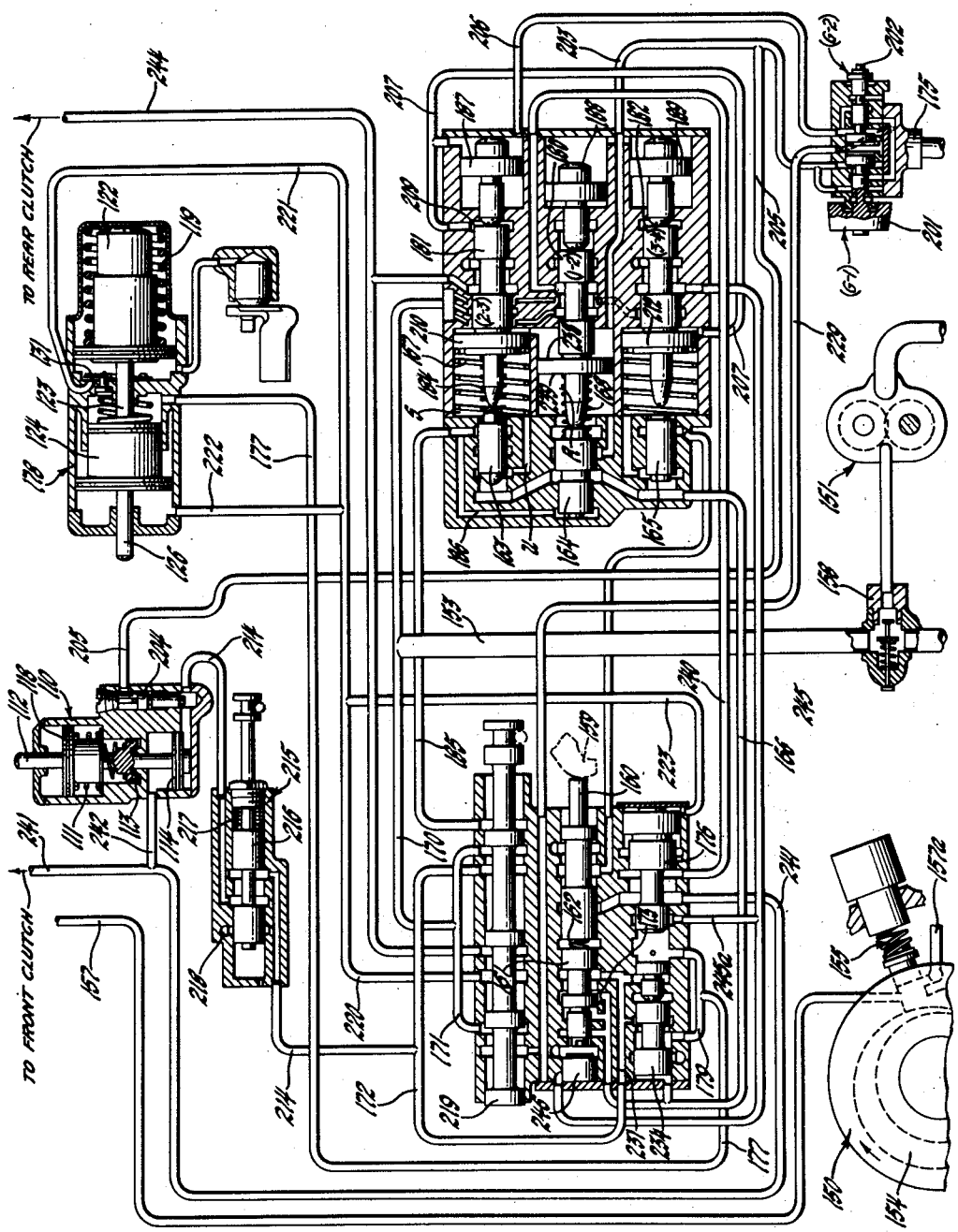

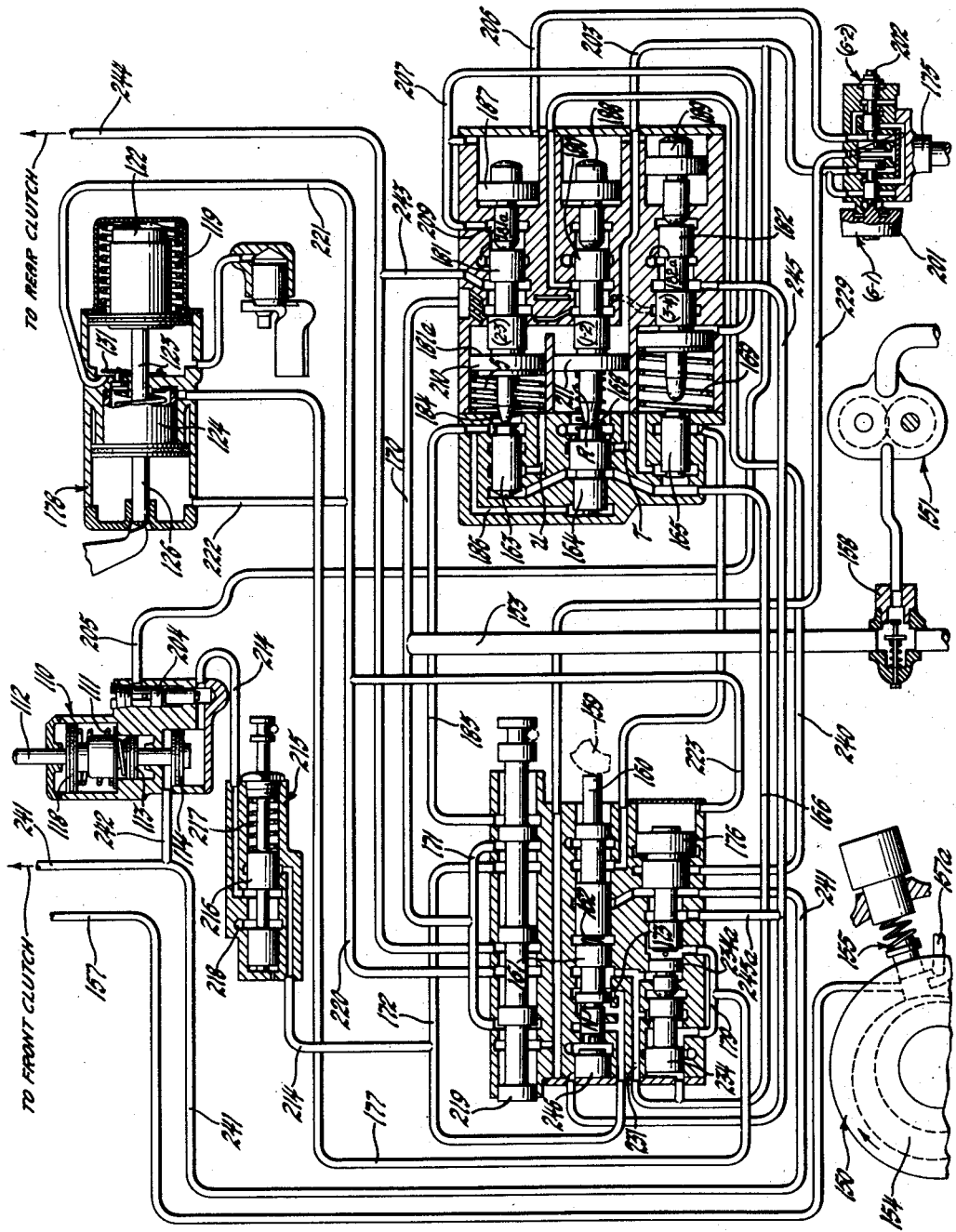

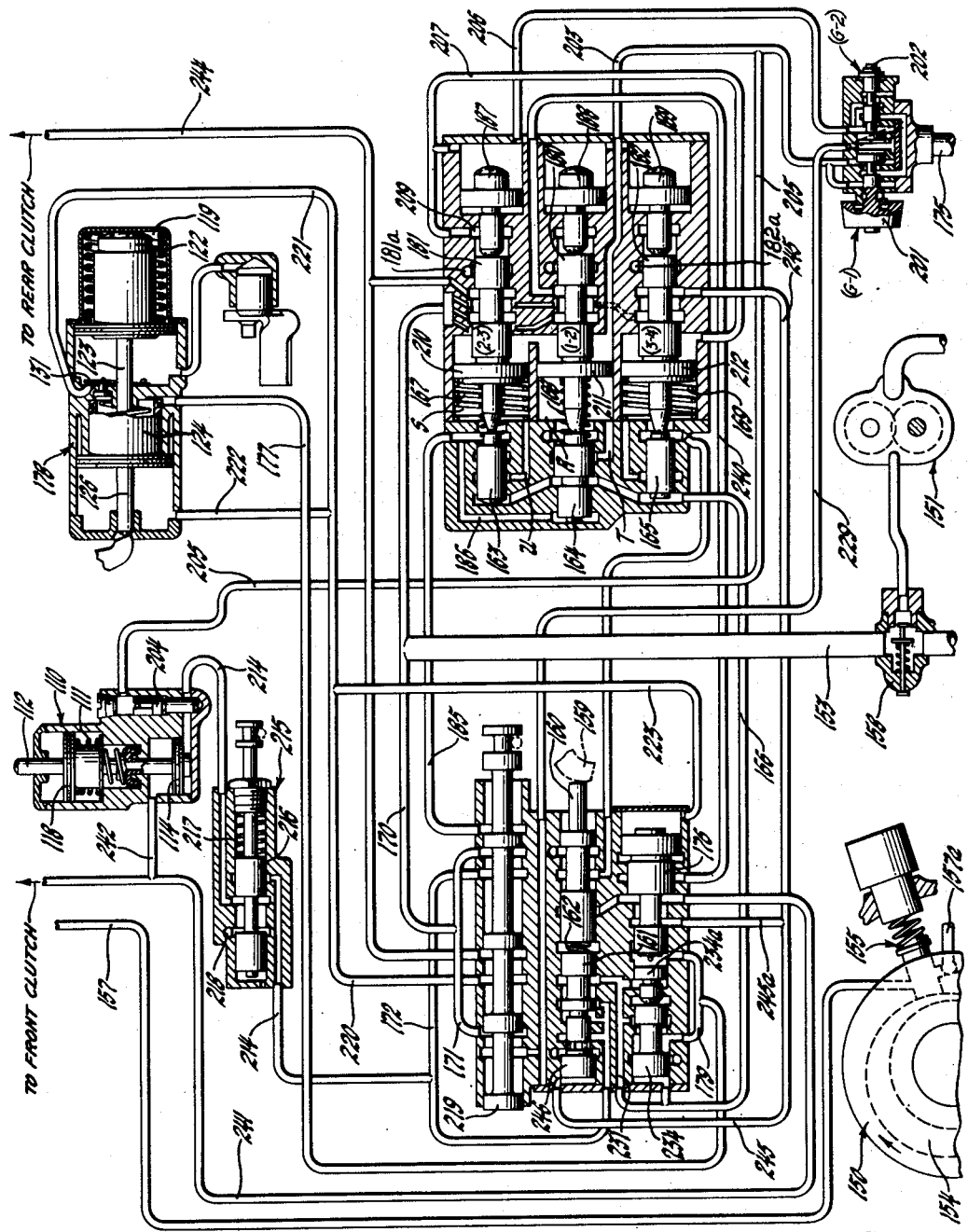

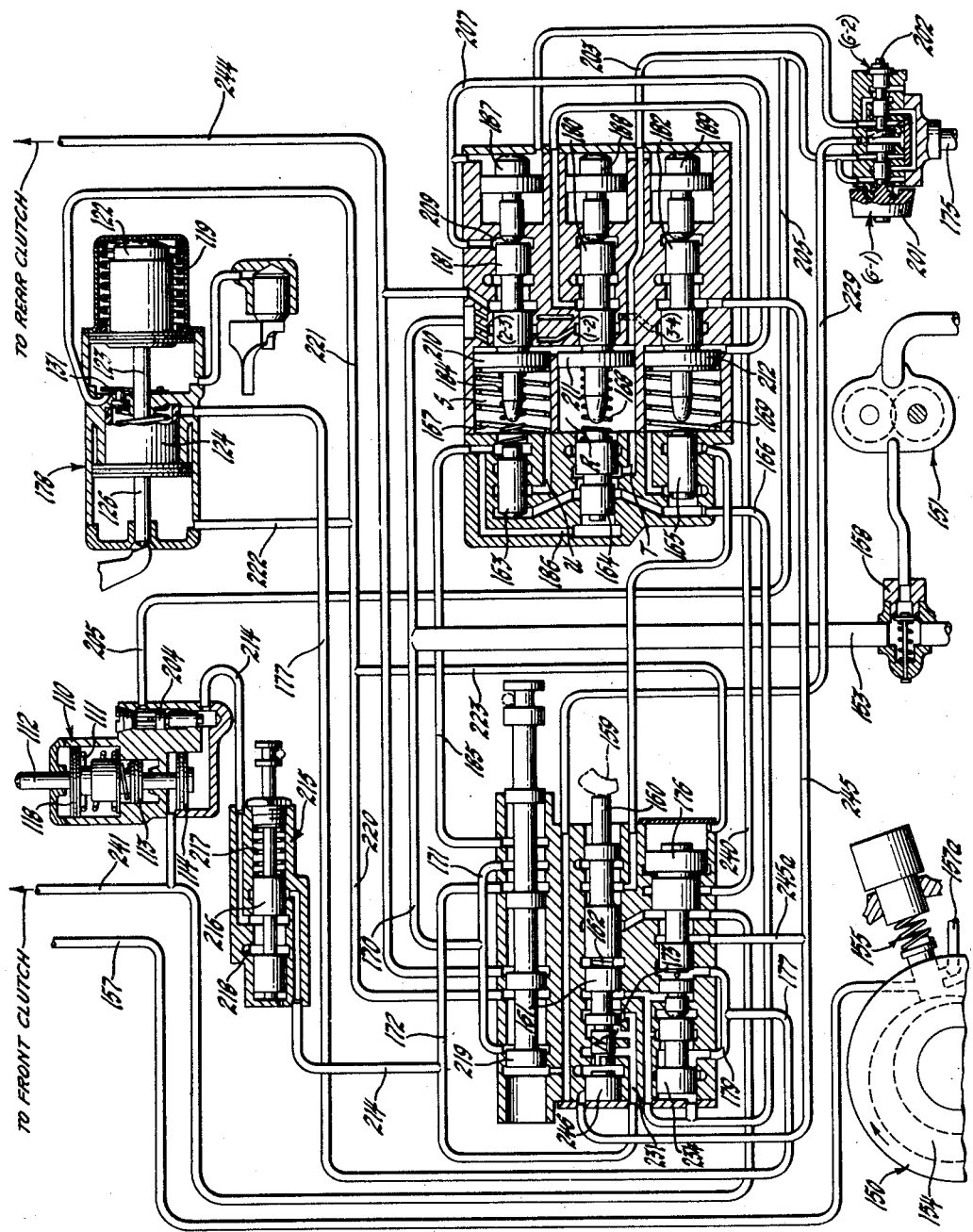

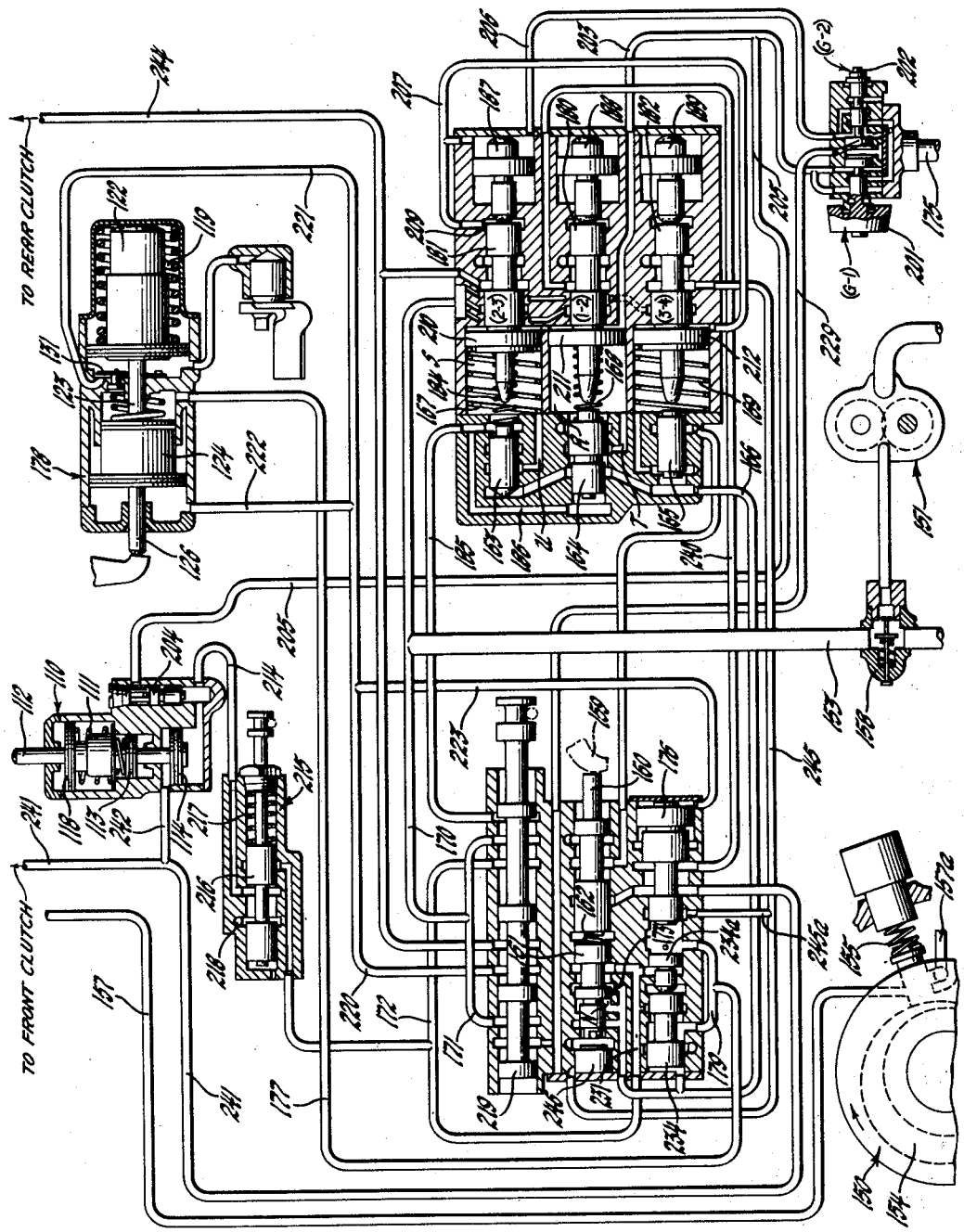

Patented July 14, 1953

2,645,135

UNITED STATES PATENT OFFICE 2,645,135

TRANSMISSION AND CONTROL

Mark H. Frank, Birmingham, Mich., assignor to General Motors Corporation, Detroit, Mich., a corporation of Delaware Application April 18, 1950, Serial No. 156,559

11 Claims. (Cl. 74—682)

This invention relates to gearing arrangements of the type combined with fluid turbines and more particularly to improvements in gearing and turbine combinations which yield multiple series of step speed ratio and the controls therefore.

The gearing arrangements and controls therefore are particularly adapted for use in motor driven vehicles, and provide for a number of related improvements wherein a graduated automatic selection of speed ratios is always available for any driving condition with a minimum of attention on the part of the driver. By this invention the transmission is simplified in construction and is arranged to obtain a "free wheeling" condition when operated in certain drive ratios and yet to automatically maintain a power flow relationship between the input and output shafts in certain other drive ratios irrespective of the relative rotational speeds of the input and output shafts. In addition, manually selective means are provided whereby the power flow relationship may be maintained in the drive ratios normally automatically providing for "free wheeling."

The invention is particularly directed to improvements in the type of transmission and controls disclosed in the patent to Earl A. Thompson, 2,204,872, dated June 18, 1940.

Relating to the preceding objects, a particular object of this invention is to provide in a multiple planetary type transmission, a one-way brake in one of the planetary units whereby power flow from the output shaft to the input shaft may automatically be interrupted under certain predetermined conditions of transmission operation whenever the rotational speed of the output shaft exceeds that of the input shaft in order to obtain a "free wheeling" effect.

A further object of this invention is to provide a manually selective means and control system whereby the effect of the one-way brake may be overcome to insure power transmission from the output shaft to the input shaft irrespective of the particular condition of operation of the planetary units of the transmission so that the "free wheeling" effect of the one-way brake may be obviated in all conditions of transmission operation.

These and other objects and advantages of this invention will be apparent from the following specification and claims taken in conjunction with the accompanying drawings in which:

Figure 1 is an elevation section of the front portion of a transmission assembly embodying this invention.

Figure 2 is an elevation section of the rear portion of the transmission assembly to complete the transmission.

Figure 3 is an enlarged view of the front planetary unit illustrating the arrangement of the various parts of the unit and particularly the relationship of the one-way brake to the sun gear of the planetary unit.

Figure 4 is a sectional view taken along the line 4—4 of Figure 3 further illustrating the details of the one-way brake.

Figure 5 is an elevation section of an alternate one-way brake and annular piston arrangement for actuating the clutch, as may be incorporated in the first planetary unit in place of the plural clutch and piston arrangement of Figures 1 and 3.

Figure 6 is an elevation section of an alternate rear planetary unit and reverse unit which may be incorporated in place of the rear planetary and reverse units illustrated in Figure 1.

Figure 7 is a sectional view of the front servo illustrating the servo as being actuated to apply the front band.

Figure 8 is a view of the front servo in its released position.

Figure 11 is a schematic diagram illustrating the clutch and band servo actuating means in relation to the clutches and bands.

Figure 11a is a schematic diagram of the pressure control system and valving utilized to control the operation of the transmission.

Figure 12 is a schematic diagram of the hydraulic control system illustrating the valving and pressures applied with the transmission operating in neutral.

Figure 13 is a schematic diagram of the control system illustrating the pressures applied with the manual valve positioned to place the transmission in first gear operation.

Figure 14 is a schematic diagram of control system with the transmission operating in second gear.

Figure 15 is a schematic diagram of the control system with the transmission operating in third gear.

Figure 16 is a schematic diagram of the control system with the transmission operating in fourth gear.

Figure 17 is a schematic diagram of the control system operating in reverse gear.

Figure 18 is a schematic diagram of the control system placed in a low speed range condition of operation.

Figure 9:
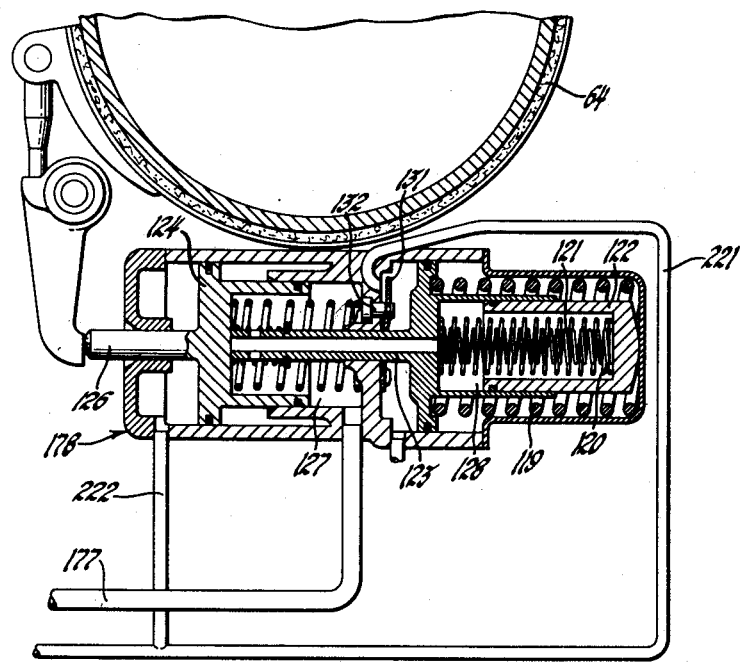
Figure 9 is a sectional view of the rear servo illustrating the servo as being actuated to apply the rear band.

Referring to Figures 1 through 3, there is shown a transmission embodying the principles of this invention in which the transmission includes a front planetary group I, a rear planetary group II and a third planetary group III, the latter of which is utilized solely to obtain a reverse rotation of the output shaft with respect to the input shaft. An engine or power input shaft 1 is operatively connected to the ring or annulus gear 5 of the first planetary group by means of a flange 2 bolted to a drum 3, which in turn is splined to a drive sleeve 4 formed integrally with ring gear 5. The front gear unit I consists of a simple planetary assembly in which a planet carrier 6 for planet gears 7 is fixed to a hollow shaft 8; a drum 11, and a one-way brake 9 adapted to connect the sun gear 10 and drum 11 to a non-rotating gland 22. Ring gear 5, planets 7 and sun gear 10 are constantly meshed, the sun gear being formed integrally with a rotatable sleeve member 22a. Spindles 12 for planets 7 are fixed in carrier 6 and are attached to an inner clutch drum 13 which carries a plurality of clutch plates 14 adapted to mate with clutch plates 15 carried by and fixed to rotate with drum 11. A presser plate 16 cooperates with a piston 17 to engage the clutch plates whenever piston 17 is caused to move toward the clutch plates. Fluid pressure is utilized as the actuating force on piston 17 to engage the clutch plates and may enter cylinder 18 through port 19 and passages 19a and 19b. A spring 17a serves to disengage the clutch plates whenever fluid pressure is released from cylinder 18.

The clutch means is composed of a plurality of similar clutch members 14, 15 and piston arrangements 20 spaced circumferentially around the shaft 8, all of which are actuated simultaneously upon admission of fluid pressure to port 19.

Details of one-way locking device or brake 9 are illustrated in Figure 4, in which the locking device is shown as including a series of spaced pockets 9a inward of member 22a which pockets are adapted to receive one-way locking elements 21, the locking elements being pocketed for cooperation with races formed between the non-rotating gland member 22 and rotating portion 22a. The non-rotating gland member 22 is secured to a housing flange 100d and is formed to provide a series of spaced cam surfaces 24 positioned to urge the locking elements outwardly into contact with the inner surface of the rotating portion 22a. Separating the various pockets from each other are a plurality of arms 25, each having a hollow chamber 26 adapted to receive a hollow piston 27. A spring 28 enclosed within each piston normally urges the piston outwardly to contact a shoe 29 carried by each locking element 21 so that the locking elements are urged outwardly upon cam surfaces 24 and into contact with the inner surface of the rotatable portion 22a of the brake. A port 30 is provided in each arm 25 to insure lubrication of the cylinder walls in order to prevent sticking of the pistons in the cylinders.

Further referring to Figure 2, hollow shaft 8 extends to the rear planetary unit compartment at the right where it is splined to the inner clutch drum 17 of the rear planetary unit. The rear unit consists of a compound planetary assembly comprising three sub-groups. The central group of these is driven by a sun gear 31 attached to a solid shaft 32, the gear 31 meshing with planet gears 33 supported in a planet carrier 34 and which, in turn, mesh with a ring gear 35. Carrier 34 is attached to an output shaft 50. The leftward group similarly consists of a sun gear 36 attached to shaft 32 meshing with planet gears 37 spindled to a carrier 40, the planets meshing with a ring gear 41. Carrier 40 is fixed to and carries ring gear 35. Ring gear 41 is attached to a clutch drum 42 arranged to support clutch plates 43 mating with clutch plates 44 splined on clutch drum 17. A piston 45 serves to engage clutch 43—44 against the action of release spring 46 when fluid pressure is supplied to cylinder 47 through passages 48 and 49.

At the right, the reverse planetary group includes a sun gear 54 attached to a sleeve 54a splined to a drive flange 54b bolted to drum 42 which carries ring gear 41; gear 54 being in mesh with planet gears 55 on spindle 56 of carrier 57 attached to output shaft 50. Ring gear 58 meshes with planets 55 and is toothed externally at 59 so as to be capable of being locked against rotation by appropriate means, hereafter more fully explained.

A pair of fluid pressure pumps (not shown) may be driven by gear 4a, and drive sleeve 4 and cross shaft 63 mating with gear 62, respectively, to provide a source of fluid pressure for actuating the speed ratio change servomotors of the transmission. These pumps are shown as pumps 150 and 151 in Figure 11a. The rear unit clutch drum 42 and front unit clutch drum 11 are surfaced externally for gripping by friction bands 64 and 64a, respectively. As heretofore explained, the front unit clutch drum 11 is equipped with one-way roller brake assembly 9 for preventing backward rotation of the drum and sun gear 10 and for permitting forward rotation of the same. A second means for preventing both forward and reverse rotation of drum 11, namely band 64a may also be provided, the band being used only in two conditions of operation as hereafter set forth in more detail.

Enclosing the transmission assembly is a composite housing 100, which includes a sectional portion 100a attached at the left to the engine casing and to a mid-section 100b having a web 100c at the left and a web 100d at the center. The rear portion of section 100b is attached to a rear closure housing 100e, which housing includes a web portion 100f. The forward compartment to the left of web 100c surrounds drum 3 and flange 2. The central web 100d provides passages for controlling servo pressure and supports a gland collar 102. Output shaft 50 is supported by bearing 103 in web 100f, and is piloted on shaft 32 at 104. Shaft 32 is supported at its opposite end by means of a bearing 105.

A fluid flywheel unit F at the left consists of an impeller rotor 65 attached to hub 66 fixed to shaft 8, and a mating rotor 67 attached to a hub 68, which in turn is secured to shaft 32.

*Operation of the transmission arrangement of Figures 1 and 2*

The ratio drive pattern of the gear assembly provides four speeds forward and reverse, the forward drive being obtained without torque interruption. In addition, torque interruption from the output to engine shaft is provided for under certain predetermined conditions of transmission operation so as to obtain an over-running or "free wheeling" effect upon deceleration of the vehicle in two of the four forward speeds. Also, means are provided for overcoming the torque interruption from the output to engine shaft so that the "free wheeling" effect may, by choice, be obviated.

The lowest forward ratio is obtained by clamping band 64 on drum 42. Under engine torque the one-way brake unit 9 prevents reverse rotation of drum 11 and sun gear 10 of the front unit so that the drum and sun gear are held stationary. Power applied to ring gear 5 by drum 3 causes planet gears 7 to roll forward around gear 10 while urging the sun gear 10 backwardly to lock the one-way brake unit 9. Planet carrier 6 is thus caused to rotate forwardly at slow speed, imparting forward rotation to hollow shaft 8 and thus to impeller 65. Rotor 67 is driven by the kinetic flow of oil generated by impeller 65, and applies rotation to shaft 32 to turn sun gears 31 and 36 of the rear unit. Since band 64 (when applied) prevents rotation of ring gear 41, carrier 40 is rotated forwardly, driving ring gear 35 forwardly. Simultaneously, sun gear 31 has a second component, the ring gear 35 and sun gear 31 each contributing a forward component to the planets 33 of the rear unit, causing planet carrier 34 and output shaft 50 to rotate forwardly.

In order to obtain the second forward speed ratio, the clutch plates 14—15 of the front unit are engaged by reason of actuation of suitable controls admitting fluid pressure behind piston 17 to force presser plate 16 to overcome the action of spring 17a and to engage the clutch plates. In this condition of operation, carrier 6 and sun gear 10 are locked together for common rotation with ring gear 5 so that the one-way brake unit 9 is released by the forward rotation now applied to drum 11 and sun gear 10, the hollow shaft 8 and impeller 65 being driven at engine speed. In this manner the kinetic action of the fluid flywheel unit F causes rotor 67 to accelerate. Shaft 32 is driven at increased speed, this speed being imparted to sun gears 36 and 31 of the rear unit for driving output shaft 50 at the second speed ratio.

In order to obtain third speed ratio, clutch 14—15 of the front unit is released at the same time clutch 43—44 of the rear unit is being engaged. The reaction of engine torque through the front unit gears causes sun gear 10 to decelerate to zero, whereupon it is stopped from backward rotation by one-way brake 9. Clutch 43—44 now couples hollow shaft 8 to ring gear 41 of the rear unit. Hollow shaft 8 distributes engine torque to fluid flywheel unit F, and simultaneously to rear unit ring gear 41. Ring gear 41 imparts one forward component to planets 37 while shaft 32 delivers a second component from rotor 67 to sun gear 36. Planet carrier 40 is therefore driven by planets 37 at a differential ratio, and this is applied to the ring gear 35 of the central group. Simultaneously, sun gear 31 is driving planets 33 so that carrier 34 of output shaft 50 is driven at a differential ratio thereof, at third speed ratio.

Transition to fourth speed ratio is obtained by re-engaging the clutch 14—15 of the front unit. This causes the gear elements of the front unit to rotate at common speed, imparting a forward component to sun gear 10 and drum 11 to release the one-way brake 9. With carrier 6 and shaft 8 at engine speed, shaft 32 is driven by the fluid flywheel unit F at a speed reduced only by the slip ratio of the unit F, and the ring gear 41 imparts an engine speed component to planets 37 while sun gear 36 imparts that component derived from rotor 67. Carrier 40 therefore applies this differential to ring gear 35 for rotating planets 33 while sun gear 31 furnishes a second component, resulting in driving carrier 34 and output shaft 50 at a speed ratio which is substantially one to one, except when the engine speed falls to a range below that at which fluid unit F is capable of transmitting a substantial torque fraction.

It will readily be understood that the automatic action of one-way brake unit 9 serves the useful purpose of providing for smooth transitions in the ratio shift pattern, as well as curtailing the control requirements to a minimum. For example, the band normally utilized to prevent rotation of the drum 11 and sun gear 10 in transmissions of this type may be entirely eliminated, as may the servo-units normally used to apply and release the band.

In Figure 1, it will be noted a band 64a extends around drum 11. In operating a vehicle equipped with the transmission disclosed, it will be understood that with the transmission set to operate in either first or third gear that rotation of shaft 50 at a speed in excess to that of the speed of rotation of shaft 8 (as when the vehicle is decelerating with closed engine throttle) will normally result in uncoupling of the one-way brake unit 9 so that no power can be transmitted through the one-way brake. Thus, a "free wheeling" condition is normally obtained in first and third speeds. At the same time, the "free wheeling" condition is overcome whenever the clutch 14—15 is engaged, as is true both in second and fourth speeds forward.

At times, it may be desirable to prevent a torque interruption between the engine shaft and output shaft upon vehicle deceleration even in first and third speeds. This is accomplished by means of band 64a which may selectively be applied to restrain drum 11 and hence sun gear 10 from rotation, regardless of the speed differential between the input and output shafts. The bands 64a and 64 may be applied by means of suitable servos hereafter more fully described.

Since the one-way brake is sensitive to directional rotation of sun gear 10, it is apparent that the idling rotation of the engine-connected parts could tend to cause a small reverse torque to be expressed upon sun gear 10, during intervals when band 64 and clutch 43—44 of the rear unit are released. This has the useful purpose of pre-setting the front unit reaction locking means, or of biasing it in readiness for taking the load of the drive-reaction torque. If, however, the frictions present during the no-drive interval should tend to cause sun gear 10 to rotate forwardly, the net speed of such rotation is small, so that the drive establishing action of brake band 64 on drum 42 immediately results in transferring a load component through the unit F to carrier 6, and the sun gear 10 is required to cease forward rotation and be locked at zero speed to the casing web 100d by the brake unit 9. This action normally precedes the arrival at zero speed of drum 42 under braking by band 64, since that band requires a time fraction to lock drum 42. It is important to note that the engaging action of the one-way brake is subject to the slip torque of the turbine unit so that smooth engagement is obtained as hereafter set forth in more detail.

To obtain a reverse drive to planet carrier 57, ring gear 58 is held against rotation by means of a pawl 70 cooperating with teeth 59. One-way brake 9 prevents rotation of sun gear 10, while in the rear unit, both the clutch 43—44 and brake 64 are disengaged. Under this condition of transmission operation the fluid flywheel drives shaft 32 forward at low speed. Sun gear 31 of the secondary rear group spins planets 33, and since the carrier 34 is loaded by vehicle inertia, ring gear 35 endeavors to rotate backward. In the primary group of the rear unit the sun gear 36 rotates planets 37 to spin ring gear 41 backward, while the carrier 40 tied to ring gear 35 of the secondary group is also providing a backward, or reverse component.

The net resultant of these components is to rotate ring gear 41, drum 42, member 54b and reverse sun gear 54 reversely. This resultant is applied to the reverse gear unit through planet gears 55 (ring gear 58 being held by pawl 70), the output of the reverse gear unit being applied to shaft 50 through planet carrier 57.

The mechanism for seating and releasing the reverse gear pawl 70 consists of a shaft 71 centered in a bore of an extension of the casing 100 having an eccentric pin 71a and roller 71b intersecting a slot 70a cut in the outer end of pawl 70. Spring 72 in a recess of pawl 70 presses pin 73 upward against roller 71b, so that on the engaging stroke when shaft 71 is rotated to seat pawl 70, the seating force is applied through spring 72, which permits relative motion between pawl 70 and teeth 59 of the drum 59a until the drum comes to rest, when full tooth seating occurs. Shaft 71 is rocked by arm 74 from a common control for the front and rear unit valving.

In Figure 5, there is shown an alternative form of front gear unit which may be substituted for the front gear unit illustrated in Figures 1 and 3. Parts corresponding to the same parts as shown in Figure 1 are given corresponding reference numerals to those of Figure 1, while those differing substantially are assigned new reference numerals. Splined to hollow shaft 8 is a planet carrier 6 for planet gears 7. Also included in the assembly are a drum 11 and one-way brake 9 interconnecting sun gear 10 and drum 11. Ring gear 5 is formed integrally with a drive sleeve 4. Clutch plates 14 splined to planet carrier 6 are adapted to engage clutch plates 15 splined to drum 11 when fluid pressure is directed behind piston 75. A single annular piston 75 is utilized to cause engagement of the clutch plates in accordance with a control system hereafter more particularly described. Piston 75 includes an annular bearing surface 76 for forcing the clutch plates into engagement against the action of release springs 15a. This embodiment is more simple and less expensive to manufacture and install than is that which includes a plurality of separate pistons as illustrated in Figures 1 and 2. It also has the advantage of more uniform application of pressure to the clutch plates than is obtained by use of the structure of Figures 1 and 2. The one-way brake 9 operates in the same manner as does the one-way brake of Figures 1, 3 and 4.

It will be noted that in Figure 5, there is no band shown corresponding to the band 64a of Figure 1. With this arrangement, brake 9 functions to prevent backward rotation of sun gear 10 in first and third speeds and the band 64a may be entirely eliminated. With the band eliminated, no overtaking torque can be transmitted through the one-way brake 9 in a direction from the output shaft to the input shaft in either first or third speed as heretofore explained. A vehicle equipped with the first planetary arrangement shown in Figure 5 will, therefore, automatically "free wheel" in first and third speeds.

*Action of one-way brake*

The one-way brake 9 constitutes a locking device which prevents rearward or reverse rotation of drum 11 and sun gear 10 whenever clutch 14—15 is disengaged, as in first and third speeds. Drive sleeve 4 constitutes a power input member which carries ring gear 5, which in turn transmits rotation to the planet gears 7, which in turn mesh with the sun gear 10. Rotation of the planet gears tends to cause reverse rotation of sun gear 10 and drum 11 which carries the sun gear. The one-way brake 9 locks drum 11 to housing flange 100d through member 22 to prevent reverse rotation of the drum and sun gear so that the sun gear functions as a reaction element. That is, the planet gears are caused to travel around the stationary sun gear, thereby imparting rotation to impeller 65 of the fluid turbine F. The rapidity with which the rollers 21 of the one-way locking device engage the inner surface 22a of the stationary member 22 depends upon reaction imparted to sun gear 10 and drum 11, which reaction is dependent upon the slip torque in the fluid turbine unit F. Thus, whenever clutch 14—15 is disengaged, the locking action of the locking device is subject to the slip torque of the fluid turbine unit. This is very important since it provides for smooth engagement of the power transmitting elements of the planetary unit, thereby greatly minimizing the "bumps" normally occurring in transmissions of this type when manually applying the means (such as band 64a) for preventing rotation of the reaction member. Thus, in first and third speeds, the means for preventing reverse rotation of the reaction member is engaged entirely automatically and the rate of engagement of the parts of the locking means is dependent upon slip torque in the fluid turbine unit. It will readily be understood that with the engine idling, rotor 67 will be stationary while impeller 65 rotates. Slip torque in the fluid turbine unit applied through shaft 8, carrier 6, planet gears 7 to sun gear 10 will pre-set the locking device in locked position to give a smooth power flow when increased power is applied to drum 3 to accelerate the vehicle. Upon shifting from either fourth to third or second to first speed, drum 11 is decelerated to zero speed and the slip torque in the fluid turbine is effective to cause smooth engagement of the locking ports of the locking device. Thus, the slip torque in the fluid turbine cushions any sudden jolts or bumps which might otherwise occur in engaging the one-way locking means.

An alternative form of rear planetary unit and reverse gear arrangement which may be substituted for the double planet gear assembly of Figure 1 is shown in Figure 6. The first planetary unit (not shown) is the same as illustrated in Figure 1.

Referring to Figure 6, solid shaft 32 extends to the output shaft 50 in which it is journaled at one end. A single sun gear 80 fixed upon shaft 32 meshes with planet gears 81, the carrier 82 of which is secured to output shaft 50. The rear unit ring gear 83 is fixed to and carried by clutch drum 84, which clutch drum is operatively connected to the reverse sun gear 85 by means of a reverse drive flange 87, splined to the reverse sun gear. Clutch drum 84 carries a plurality of clutch plates 88 fixed to the drum and adapted to cooperate with clutch plates 89, the latter plates being supported upon an inner clutch drum 90, which in turn is splined to hollow shaft 8.

Reverse sun gear 85 meshes with reverse planet pinion 91, which in turn meshes with ring gear 92 carried by reverse drum 93. Reverse drum 93 is splined as at 94 so that rotation of the drum may be caused to cease, as through the actuation of a pawl (not shown) as described in connection with Figure 2. Planet carrier 95 is splined to output shaft 50.

In order to obtain forward speed, either the band 96 must be applied to drum 84 or the clutch plates 88—89 must be engaged. To obtain reverse rotation of output shaft 50, the ring gear 92 is held against rotation by means of a pawl (not shown) cooperating with teeth 94, and the clutch 88—89 and band 96 of the rear planetary unit are released. Due to inertia loading of shaft 50, rear planet carrier 82, splined to shaft 50, will tend to remain stationary. Torque applied to sun gear 80 through shaft 32 will cause planet gears 81 to rotate about the spindles supporting the planet gears, thereby causing reverse drive flange 87 to rotate in a reverse direction to that of sun gear 80, through action of ring gear 83 fixed to the reverse drive flange. Rotation of reverse unit sun gear 85 in a rearwardly direction will cause reverse pinions 91 to travel around the ring gear 92 in a reverse direction. Thus planet carrier 95 and output shaft 50 are caused to rotate in a reverse direction to that of sun gear 80.

Referring further to Figures 1 and 7 through 10, means are shown to engage and release the various clutches and brakes of the transmission. Clutch 14—15 is engaged by presser plate 16 moved by pistons 17 in cylinders 18 integral with drum 11, fed by fluid pressure in passages 19a and 19b, receiving fluid pressure from orifice 19 from a controlled external source. Brake band 64a is applied only when the operator wishes to overcome the free-wheeling effect of one-way brake 9 in first and third speeds.

In Figures 7 and 8, the front band apply servo 118 is illustrated in its applied and released positions, respectively, actuation of the servos is dependent upon the positioning of a control lever in the vehicle to position a manual valve to direct fluid pressure to the servos. When the control lever (not shown) and manual valve for directing oil flow to the servo is in "neutral," no oil pressure is directed to the servo. Under this condition, retracting spring 111 forces the apply piston assembly consisting of stem 112 and pistons 113 and 114 to its bottom position so that band 64a is released from drum 11. (See Fig. 8.)

With the control lever and manual valve in either the "High," "Drive," "Low" or "Reverse" position, pump pressure is directed to cylinder 115 through line 214 to move the piston 114 and stem 112 to apply the band.

To release the band, pump pressure is applied to cylinders 115 and 116 through lines 241—242 so that the piston 114 is forced downwardly to open the passage 117 through stem 112 regardless of the fact that main line pressure is applied to the under-surface of piston 115 through line 214. Pump pressure passing through hollow stem 112 forces piston 118 downwardly to release the band.

As will be understood in detail further, automatically derived variable governor pressures are used to obtain automatic shift. A valve 204 hereinafter termed a 4 to 3 downshift valve controls the passage leading from line 205 to cylinder 115. At car speeds below a predetermined speed, for example twenty-five miles per hour, pump pressure from line 205 under the 4 to 3 valve keeps the valve raised so that the entire passage leading to cylinder 115 is open. At car speeds above twenty-five miles per hour pressure on top of the 4 to 3 valve is sufficient to restrict the oil flow, which delays front band application and permits engine speed increase before the front unit goes into reduction during the 4 to 3 downshift. This same condition exists on full throttle 2 to 3 upshifts described further below.

Figure 10:
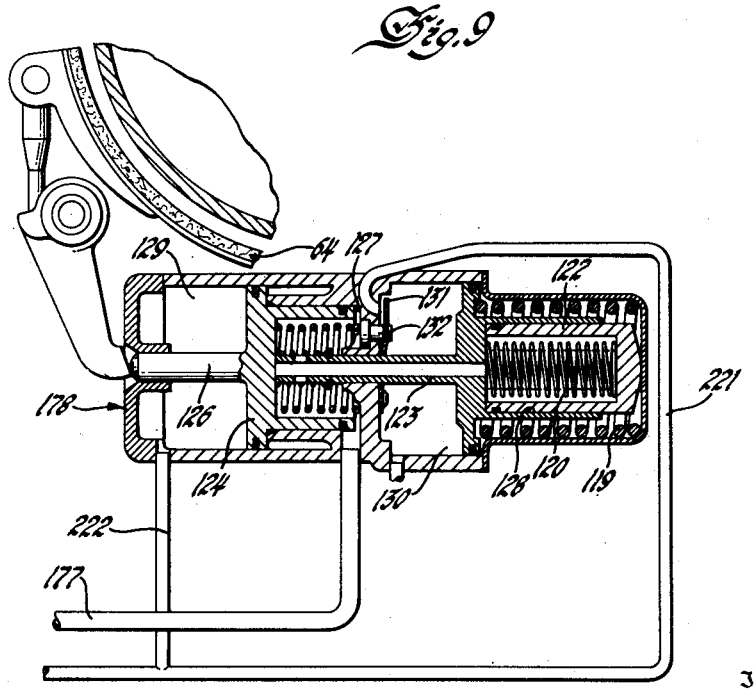
Figure 10 is a similar view of the rear servo in its released position.

The rear servo 178 for applying band 64 is illustrated in Figures 9 and 10. The rear servo is applied by servo springs 119, 120 and 121, which act on the accumulator piston 122, the stem 123 of which contacts the booster piston 124, applying the band through stem 126.

As hereafter more fully explained, compensator pressure from line 177 is applied to cylinder 127 and through hollow stem 123 to cylinder 128 to assist the servo springs and to prevent the band 64 from slipping during rapid acceleration. As later set forth in more detail, compensator pressure is always present whenever there is any carburetor throttle opening, and increases with the throttle opening.

Pump pressure is applied through lines 221 and 222 to cylinders 130 and 129, respectively, on the opposite side of pistons 124 and 122 to release the rear band 64. The force applied is greater than the force of the servo springs and compensator pressure and the servo pistons are moved to the released position illustrated in Figure 10.

An accumulator check valve 131 in the rear servo controls the passage through which oil flows to the face of the accumulator piston opposite the springs. Oil passing through this passage from line 221 lifts the check valve off its seat, thereby allowing the oil to flow freely to release the band 64.

The check valve operates in two different manners as follows:

On a closed throttle downshift, when the pump pressure in chamber 130 is being released through passage 221, the check valve is seated, causing oil pressure being dumped to passage 221 to pass through a relatively small orifice in the check valve, thereby delaying the application of band 64.

With an open carburetor throttle downshift (as would occur when the vehicle is under heavy load or climbing a steep grade) compensator pressure from line 177 acting in chamber 127 acts upon the end of valve plunger 132 to prevent the check valve from seating. With the check valve unseated, oil pressure is permitted to exhaust from chamber 130 to passage 221 at a rapid rate so that band 64 may be quickly applied through action of the servo springs.

*Hydraulic control system (oil pressure)*

The timing of the changes in gear ratios is accomplished by means of the hydraulic control system, which basically is a system of valves balanced to provide a definite relationship between the speed of the car and the performance demands as expressed by the position of the accelerator pedal and carburetor throttle valve.

PUMP PRESSURE

In Figures 11 and 11a, there is shown a schematic diagram of a transmission hydraulic control system in which a first gear pump 150 driven by the engine and a second gear pump 151 driven by the transmission output shaft provide oil pressure to a main pressure line 153. Pump 150 operates whenever the engine is running and delivers its maximum capacity directly to the pressure feed line 153 as soon as the engine is started. The rear pump operates whenever the car is in forward motion. When the oil pressure attains a predetermined valve, for example 80#/sq. in., a pressure regulator valve 155 opens to permit oil flow to the fluid coupling 156 through line 157. A bypass valve 157a functions to discharge surplus oil to the transmission crankcase.

When the vehicle moves forward, rear pump 151 driven by the transmission output shaft builds up pressure against a check valve 158; so that upon opening of the check valve, the rear pump oil flows to the valve body.

THROTTLE PRESSURE

As the accelerator pedal of the vehicle is moved to open the carburetor throttle valve, linkage (not shown) to a lever 159 on the transmission moves a metering type valve termed a "T" valve 160. Movement of "T" valve 160 opens throttle valve 161 through force of spring 162. The pressure delivered by throttle valve 161 is therefore a variable pressure depending on how far the accelerator is opened. This throttle valve pressure is directed to regulate plugs 163, 164, 165 through pipe 166; which aids fixed spring force applied by springs 167, 168, 169 to oppose governor pressure applied to the opposite end of the shifter valves 181, 180 and 182.

When the throttle valve is opened, oil pressure (pump pressure) flows through branch lines 170, 171, 172 to an opening 173 of the valve. There is a passage leading to the area indicated as N on the throttle valve against which this throttle pressure acts to push the throttle valve closed against the spring force, closing off the opening. The farther the throttle is opened the more force is exerted against the spring to open the valve; therefore, more oil pressure is exerted upon the opposite side of the throttle valve to close it against the spring force. In this manner, the valve takes an equilibrium position, balanced between spring force and throttle pressure. If the throttle is opened slightly beyond idling the oil pressure applied to the shift valves through line 166 will be low. Oil pressure applied to the opposite end of the shifter valves from governor 175 (as hereafter more fully explained) will then open one of the shift valves at a low car speed, and as a result will shift to increase the transmission ratio at a low car speed. If the throttle is opened wide, greater car speed will be required to build up governor pressure to open the shift valves, delaying the upshift action under which the transmission will shift to the higher ratios at higher car speeds. Thus, the position of the shift valves is controlled by pressure differential between governor pressure and throttle valve pressure, the latter being dependent upon the position of the carburetor throttle valve as determined by the accelerator pedal and the former depending upon pump speed.

COMPENSATOR PRESSURE

A further pressure value is determined by the throttle pressure and is described as compensator pressure. This compensator pressure is provided by the throttle pressure valve 161. That is, the same throttle pressure which is directed to the regulator plugs of the shifter valves through line 166 is also directed against one end of the compensator valve 234. This pressure pushes the compensator valve to the right to open a port to admit pump pressure from lines 172 and passage 231 to the compensator valve 234.

The pump pressure metered against the large section of the valve and through line 179 against the compensator valve plug 234a closes the compensator valve against throttle pressure. The compensator valve then becomes balanced between throttle oil pressure and compensator oil pressure. Movement of the compensator valve regulates pump pressure in proportion to the throttle pressure. As the throttle pressure in line 166 is regulated by the throttle opening, the demand on rear servo 178 increases for tighter band action to prevent slippage with increase in speed. Therefore, regulated compensator pressure is applied to the rear servo through line 177 to assist the normal apply pressure in keeping the band more tightly held around the drum. Compensator pressure from line 179 acting upon compensator valve plug 234a also positions double transition valve 176 when the throttle is opened for proper upshift after bringing the vehicle to a stop with a closed throttle. In addition, it also positions the double transition valve for a third to second down shift when slowing down under full throttle while under heavy load, as climbing a steep hill.

MODULATED THROTTLE PRESSURE

In the "High" range position of the manual control valve, the first to second, and second to third shifter valves 180 and 181 respectively, have modulated throttle pressure applied to them at chambers R and S at approximately one-third throttle opening. This is influenced by the light regulator springs 184 and 168 located between the shift valve 181 and the regulator plug 163, and regulator spring 168 located between shift valve 180 and regulator plug 164 so that throttle pressure acting on pistons 210 and 211 must be overcome before the regulator plugs can be moved. As throttle pressure increases, it moves the regulator plugs sufficiently to open ports (T, U) permitting throttle pressure from line 166 to meter past the regulator plugs and work against the pistons 210 and 211 of the shift valves 180 and 181 to oppose governor pressure. This so-called modulated throttle pressure provides for: shifts at low speeds and light throttle openings; shifts at higher speeds and heavier throttle openings, and insures that all shifts between low and high speeds are proportioned to throttle opening. Throttle pressure acts upon the third to fourth shift valve 182, without modulation.

With the selector lever and manual valve 219 in the "Low" range position, pump pressure is directed under the first to second regulator plug 164 (through lines 185, 186) to open a port so that throttle pressure acting against the large area of valve 180 is directed under the first to second shift valve 180 without exerting any of its force to move the regulator plug 164 against the spring 168. The increased throttle pressure under the shift valve requires a higher governor pressure to shift the valve. This action provides for a shift from first to second at a higher car speed in "Low" range rather than in "High" range position for the same throttle opening.

GOVERNOR PRESSURE

Governor pressure is used to shift the shift valves in the valve body to their open position, but this same governor pressure is opposed by springs and by throttle pressure delivered to the opposite end of the shift valves, as earlier explained, to control the timing of the shifts. The governor 175 is of the centrifugal type being driven from the transmission output shaft. Two governor pressures are supplied; G–1 from the large governor weight 201 and G–2 from the small governor weight 202. These two pressures work against the shifter valves and governor plugs 187, 188 and 189. The governor itself does not form a part of this invention and need not be shown in further detail. A satisfactory form of governor is shown and discussed in the patent to Earl A. Thompson, 2,204,872, issued June 18, 1940.

The G–1 pressure controls the shift of valve 180 (which valve controls shift from first to second speed) since it delivers high pressure at low vehicle speed. G–1 pressure is supplied to shifter valve 180 through conduit 203 and to the downshift valve 204 through a conduit 205. The G–2 pressure along with G–1 pressure controls the shift of the shift valve 181 (second to third) and 182 (third to fourth) speeds. G–2 pressure is fed to valve 181 through line 206 and to valve 182 through line 207. G–2 pressure works against the governor plug 187 and small end 209 of the second to third shift valve 181; while G–1 pressure works against the large surface 210 of the valve, being admitted from line 203 to the large surface 208 through a suitable porting leading from valve 180. By directing the pressure in this manner, it is possible to delay the shift to a higher car speed or until the G–2 pressure, which builds up slowly, has reached a high enough pressure to assist the G–1 pressure to open the shifter valve. Valve 182 controls the third to fourth speed shift. The G–1 pressure is directed to the governor plug 189, while the G–2 pressure is directed through conduit 207 against the large surface 212 of the shifter valve. Governor will not shift the transmission at normal throttle until the pressures are great enough to hold the shift valves open against full throttle pressure.

The downshifts are controlled in the same manner but occur when throttle pressure and spring force overcome governor pressure as vehicle speed decreases.

*Fourth to third downshift valve*

The fourth to third speed downshift valve 204, discussed in connection with Figures 7 and 8 located in the front band apply servo, has a small orifice in one end. The valve operates from front band apply (furnished through line 214) pressure and G–1 governor pressure (supplied by line 205). That is, front band apply pressure pushes the valve out so that there is no restriction to band apply pressure. At a predetermined speed, for example, twenty-eight miles per hour, the G–1 governor pressure moves the valve in so that a small orifice is inserted in the front band apply. If a forced fourth to third downshift is made at speeds above twenty-eight miles per hour the front band apply pressure must pass through the small orifice. This same action takes place on second to third wide open throttle upshift because the second to third wide open throttle upshift occurs at approximately thirty miles per hour and the G–1 governor pressure is great enough to have moved the fourth to third downshift valve so that the small orifice is in place in the front band apply passage. The purpose of the fourth to third valve is to time the front band application with the clutch release for smooth shifting when making a forced downshift fourth to third speed above twenty-eight miles per hour.

It is important to note that a manually controlled valve 215 is disposed in line 214 so as to normally cut off the supply of fluid pressure in line 214 from the servo 110 used to apply front band 64a. Plunger 216 is urged by spring 217 to block oil flow from the inlet side to outlet side of the valve. An exhaust port 218 leads to the transmission sump and normally exhausts the front servo when the line 214 is cut off by plunger 216. As heretofore explained, band 64a is not normally applied in the operation of the vehicle, but may be applied to overcome the free-wheeling effect of the one-way brake 9 in first and third speeds. By pulling plunger 216 outwardly against spring 217 the inlet and outlet ports of the valve are connected to permit fluid pressure to actuate servo 110 to apply band 64a.

*Hydraulic control (conditions of operation)*

Having made a general disclosure of the oil pressure system, the manner in which the pressures are applied in the various speed ranges to accomplish shifting of the shifter valves will now be explained.

NEUTRAL—ENGINE RUNNING

Referring to Figure 12, when the transmission selector control on steering column (not shown) and manual valve 219 is in neutral and the engine started, front servo 110 and the front and rear clutches 14—15 and 43—44 are held in released position by spring force. The manual selector valve 219 is positioned by the transmission selector control to direct full pump pressure from lines 153, 170 and 171 through lines 220, 221 and 222 to the rear servo 178 which operates the release pistons and releases the band 64. Since no power can be transmitted through the rear planetary, the condition for neutral is satisfied even though one-way brake 9 of the front planetary is engaged under engine torque. The manual valve 219 also directs the oil to the large end of the double transition valve 175 through line 223; to the large end of the 2 to 3 shift valve, through line 185; the small end of the 1 to 2 regulator plug 164 (through passage 186); and to the valve ports of the shift valves through line 170 as shown. The oil pressures at these valves, however, have no function when the transmission is in neutral. Fluid pressure is directed to the fluid coupling or torus F through line 157 at all times when either the engine is running or the vehicle is in motion.

FIRST GEAR

In order to secure proper reduction for first gear, both clutches are released, front band 64a is normally disengaged and rear band 64 is applied. The selector lever (not shown) and manual valve 219 are placed in either the "drive" or "low" position. Drive, therefore, normally occurs through the one-way locking device 9 and through reduction in the second planetary unit. The locking device is engaged by reaction forces applied to sun gear 10 through shaft 8, carrier 6 and planet gears 7. As heretofore explained, any shock occurring during engagement of the locking device 9 is cushioned by the slip torque in the fluid turbine.

As the selector control is moved from its neutral to drive position, the manual valve 219 and control system illustrated in Figure 13 operates as follows:

The manual valve 219, operated by any suitable linkage from the selector lever, is positioned to cut off the oil pressure in line 220 and 221 to rear servo 178. With the manual valve positioned for drive range operation as illustrated in Figure 13, pressure existing in passage 220 is admitted to passage 244, and is exhausted to the transmission sump by way of the 2 to 3 shift valve exhaust port 181a. After the oil pressure in the rear servo is exhausted, the rear band 64 is applied by spring force.

Pump pressure is also directed by manual valve 219 to lines 172 and 214 leading to the front servo apply piston. In normal operation, valve 215 in line 214 closes off the line so that oil pressure cannot apply band 64a. With this condition of operation, one-way brake 9 permits power to be transmitted through the first planetary unit in a direction from the engine to the output shaft, but not vice versa, so that the vehicle will "free wheel" in first or third speeds. If, however, the free wheeling effect of one-way brake 9 is not desired, it may be overcome by manually opening valve 215 as by pulling a Bowden wire located on the vehicle control panel. With valve 215 opened, oil pressure is directed to the front servo apply piston 110. This pressure overcomes release spring 119a and applies the front band 64a, so that engine braking may result in spite of the one-way action of locking device 9.

Due to the time lag normally involved in the fluid pressure system in applying band 64a when valve 215 is opened, the sun gear 10 (during upshift) will be fixed against rotation through action of the locking device 9 prior to application of the band. Thus, opening of valve 215 does not effect the smooth action of the one-way locking device or overcome the cushioning effect resulting from slip torque in the fluid turbine unit. On downshift the same condition prevails in that rotation of sun gear 10 and drum 11 is stopped through reaction of impeller 65. While the one-way locking device is incapable of preventing reverse rotation of the sun gear 10 during conditions of overrunning torque as during vehicle deceleration or descending a hill, the sun gear 10 is first brought to zero rotation by means of the reaction in the turbine unit so that any shock occurring upon application of band 64a is greatly minimized. Thus, band 64a when applied functions as a brake mechanism for preventing rotation of drum 11 and sun gear 10 when engine braking is desired in first and third speeds.

Pump pressure is also directed to the input side of the governor 175 through line 229 and to the input ports of the throttle valve 161 and compensator valve 234 through line 172 and passages 230 and 231, respectively. Pump pressure is also directed to compensator valve plug 234a through line 232. This oil pressure has no function until the throttle is depressed and the vehicle begins to move forward.

As the throttle is opened and the vehicle begins to move forward, the load on rear band 64 increases and it is necessary, therefore, to provide additional means for holding the band 64 securely against the rear unit drum to keep it from turning. This is accomplished through "compensator" oil pressure applied through compensator valve 234, lines 179 and 177.

1 TO 2 UPSHIFT AND SECOND GEAR

The operation of the control system on upshift to second gear is illustrated in Figure 14. In second gear clutch 14—15 and band 64 are applied while band 64a and clutch 43—44 are released. Since the one-way brake 9 is locked by reason of reverse torque applied to the one-way brake unit, and simply releases when no reverse torque is applied to the unit, the shift from first to second upon application of clutch 14—15 is very smooth. Application of the clutch simply places the front planetary unit in direct drive, causing drum 11 to rotate forwardly thereby releasing reverse torque acting on sun gear 10 and the drum. There is, therefore, no possibility of any bump or jolt occurring in the forward planetary unit as might occur as a result of simultaneous application of band 64a and clutch 13—14. As vehicle speed increases in first gear, the governor pressure increases accordingly, so that G-1 pressure from line 203 builds up against the 1 to 2 shift valve governor plug 188 and the large area 238 of the 1 to 2 shift valve 180. This governor pressure tends to open the shift valve against the opposition of spring 168 and the modulated throttle pressure operating against the large area 239 of the shift valve. (See Figure 13 for condition before shift is accomplished.) When governor pressure exceeds the force of the modulated throttle pressure and spring 168 acting to hold the shift valve in its closed position, the valve moves to its open position connecting lines 153 and 170 to line 240, whereupon pump pressure is directed past the 1 to 2 shift valve 180 through line 240 to the double transition valve 176 which has previously been pushed to its open position by compensator pressure. Pump pressure then passes through a port in the double transition valve 176 to line 241 to the front planetary clutch unit to apply the clutch. At the same time, pump pressure through line 242 is applied to the release side of both pistons 114 and 118 in the front servo. These two combined release pressures, applied through lines 241 and 242 plus the force of release spring 111, overcome the apply pressure (supplied by line 214), in the front servo, releasing the band at the same time the clutch is engaged, changing the front unit from reduction to direct drive. When valve 215 in line 214 is closed, as when operating in free-wheeling in first and third speeds, pressure in line 214 is blocked off by the valve so that no apply pressure is directed to the front servo. The front band release pressure, applied through lines 241 and 242, in this instance, merely aids release spring 111 of the front servo to insure complete release of the front band.

The change of the front unit from reduction to direct drive, with the rear unit remaining in reduction, changes the operation of the transmission from first to second speed.

2 TO 3 UPSHIFT AND THIRD GEAR

In third gear, drive through the forward planetary unit normally is transmitted through the one-way locking device (band 64a and clutch 14—15 being released) and drive through the second planetary unit is transmitted through clutch 43—44 (band 64 being released). As heretofore explained, release of clutch 14—15 results in cessation of rotation of drum 11 and sun gear 10. Reactive forces from impeller 65, carrier 6 and planet gears 7 first stop rotation of drum 11 and then lock the locking device to prevent reverse rotation of the drum and sun gear so that sun gear 10 acts as a reactive member in transmitting power through the front planetary unit. Since the drum 11 is substantially stationary at the time the one-way brake 9 engages, there is no shock or bump in changing from direct drive to reduction in the front planetary unit.

The operation of the control system on upshift from second to third gear is illustrated in Figure 15. As the throttle is opened and the vehicle speed increases in second gear, oil pressure from the governor in lines 203 and 206 becomes greater. The G-1 pressure in line 203, applied to the large area 181a of the 2 to 3 shift valve 181 and the G-2 pressure in lines 206 and 207 applied to the governor plug 187 and small area 209 of the 2 to 3 shift valve 181 tend to overcome the modulated throttle pressure and spring force holding the 2 to 3 valve 181 closed. (See Fig. 14.) When the governor pressure overcomes the spring force and modulated pressure, the 2 to 3 shift valve opens, applying pump pressure from lines 153 and 170 through 2 to 3 shift valve port to lines 243 and 244 leading to the clutch piston, applying the rear unit clutch. At the same time, pump pressure is directed from line 244 around manual valve 219 through lines 220, 221 and 222 to release the rear band. The application of the rear unit clutch and release of the rear unit band changes the operation of the rear unit from reduction to direct drive.

At the same time, oil is applied through line 223 to the large end of the double transition valve 176. Movement of this valve shuts off a port, shutting off oil pressure in line 241 which applied the front unit clutch and in line 242 that released the front band, and opens a line 245a connecting with line 245 leading to the 3 to 4 shift valve 182, exhaust port 182a to exhaust the front clutch apply and front band release oil pressure.

Thus, the front clutch has been released changing the front unit from direct drive to reduction through one-way locking device 9. It is important to note that in normal operation, valve 215 cuts off pressure in line 214 from the front band servo so that the band is not applied, and the drum is held stationary by action of one-way clutch 9, rather than the band. The front band is applied only to overcome the free-wheeling effect of the one-way clutch. Since the rear unit clutch is applied, the transmission is in condition for third speed operation.

3 TO 4 UPSHIFT—FOURTH GEAR

In fourth speed, both clutches 14—15 and 43—44 are applied while bands 64 and 64a are released. In changing from reduction to direct drive in the first planetary unit, the same smooth transition occurs upon application of clutch 14—15 as was explained in connection with the upshift to second gear.

The operation of the control system on upshift from third to fourth gear is illustrated in Figure 16. As the vehicle speed increases in third speed, centrifugal force acting on the governor increases, resulting in increased governor pressures against the 3 to 4 shift valve 182, governor plug 189 and the large area 212 of the 3 to 4 shift valve. When the governor pressures on the plug and shift valve 182 exceed the throttle pressure (see Fig. 15) and spring force holding the valve closed, the shift valve 182 is moved to its open position, permitting full pump pressure to pass through a port in the shift valve to lines 245 and 245a and hence to the double transition valve 176, from which it is directed through line 241 to the front unit and detent plug. Referring back to Figure 14, it will be remembered that when the front unit shifted into direct drive in second speed, the double transition valve was at its outward position, placed there by compensation pressure in lines 177 and 179 in the absence of pump pressure on the large end of the transition valve 176. The oil to the front unit came from the 1 to 2 shifter valve 180 through lines 240 and 241. The oil passage in the double transition valve directs oil pressure to apply the front unit clutch through line 241 and release the front unit band through line 242 (when the latter has been applied as when valve 215 is open), in the same manner as described in connection with the explanation of the 1 to 2 upshift.

Full pump pressure is directed through line 245 against the detent plug 246 at the end of throttle valve 161, adding an increased pressure opposed to the T valve pressure. This added pressure is to permit the T valve from opening the downshift port at normal full throttle opening.

When the front unit clutch is applied and the front band servo is released, the operation of the front unit is changed from reduction to direct drive. Since the rear unit is already in direct drive, the transmission is operating in fourth speed.

REVERSE

The operation of the control system with the manual valve 219 set at reverse is illustrated in Figure 17. When shifting into reverse the manual control lever on the control valve assembly actuates the reverse anchor crank and engages the reverse pawl mechanically with the external teeth on the reverse unit internal gear. The manual valve 219 is positioned to direct pump pressure to release the rear band application servo 178 through lines 220, 221 and 222 by connecting lines 170 and 171 to line 220. Pump pressure is also directed through the manual control valve 219 to lines 172 and 214 leading to the apply piston of the front servo. Normally line 214 is cut off by valve 215 and the front unit is operated in reduction through action of the one-way clutch 9, but when valve 215 is open, band 64a is also applied. Pump pressure is also directed through line 185 to the spring side of the 2 to 3 shift valve 181 and through line 185 and passage 186 to the 1 to 2 regulator plug 164.

Throttle pressure is directed through line 166 to the large area of both the 1 to 2 and 3 to 4 shifter valves 180 and 182, respectively, and to the end of the 2 to 3 valve 181 regulator plug 163.

Movement of the manual control valve 219 shuts off the supply of oil to the governor. The spring force acting against the opposite ends of these valves holds them in closed position.

As the throttle opens, compensator pressure in lines 177 and 179 fed to the rear servo is not sufficient to overcome the brake release pressure (pump pressure) from lines 220, 221 and 222.

The front unit is therefore operated in reduction while both the rear unit band and clutch are disengaged.

FIRST GEAR—"LOW RANGE"

Under certain operating conditions, the vehicle operator may wish to keep the transmission operating in first and second gear ratios regardless of the vehicle speed. This can be accomplished by moving the selector lever to a "low" position illustrated in Figure 18, under which condition of operation the manual valve 219 is positioned to direct pump pressure through lines 185 and passage 186 to the spring side of the 2 to 3 shifter valve 181 and to the outer end of the 1 to 2 valve regulator plug 164. This pressure, combined with throttle valve pressure from line 166, moves the regulator plug 164 against the 1 to 2 shift valve spring force and uncovers a port, allowing throttle valve pressure to enter the large area adjacent the spring 168 to force valve 180 to the right.

With the exception of the valve action, the operation of the transmission in first speed "low" range is the same as in first speed "high" or drive range.

1 TO 2 UPSHIFT AND SECOND GEAR (LOW RANGE)

As the vehicle gains speed in "low" range, the throttle pressure, plus the spring force against the 1 to 2 shift valve 180 holds the valve in its closed position much longer than in drive or "high" range. Therefore, the shift from first to second gear comes at a higher vehicle speed.

At the same time that pump pressure is being directed against the end of the 1 to 2 shift valve regulator plug 164, it is also being applied to the spring side of the large area of the 2 to 3 shift valve 181. Since this is full pump pressure, the governor pressure tending to open the 2 to 3 shift valve is unable to overcome the combined spring force and oil pressure to obtain 2 to 3 upshift. The transmission therefore will not shift above second gear.

It is not deemed necessary to illustrate the throttle linkage and manual linkage for actuating the manual and throttle valves, respectively, since such linkages are well known in the art as shown in the patent to Earl A. Thompson, 2,204,872, issued June 18, 1940.

There is thus provided in a multiple planetary transmission a one-way roller brake between the center gear and transmission case which may be utilized to replace the forward planetary brake band and hydraulic control cylinder. By this construction the jolts or "bumps" commonly encountered in shifting are greatly minimized. The roller brake permits free wheeling of the vehicle in first and third gear and thus provides smooth shifts. In addition, means are provided in the control system whereby the effect of the one-way brake may be overcome whenever free wheeling is not desired. While the valve 215 is shown as being closed in all figures except Figure 14, it will be understood that the valve may be manually held open as desired to overcome the normal "free wheeling" operation in first and third gears.

Further advantages are typified in the foregoing description, and in the appended claims.

What is claimed is:

1. In a power transmission, an engine shaft and an output shaft, a first planetary gear unit comprising a ring gear directly coupled to said engine shaft, a reaction sun gear and a drum, a one-way brake for preventing backward rotation of said sun gear and drum and for permitting forward rotation thereof, a planet carrier, planet gears mounted for rotation on said carrier and meshing with said sun and ring gears, means for clutching said planet carrier and drum for transmitting drive through said unit at unitary speed, a second brake selectively operable for preventing any rotation of said drum and sun gear irrespective of the action of said one-way brake, a second planetary gear unit having its input coupled to the output of said first planetary gear unit and its output coupled to said output shaft, a fluid pressure source, valve means for selectively coupling said second brake and said clutch to said fluid pressure source, and additional valve means selectively operable by preventing actuation of said second brake irrespective of the setting of said first-mentioned valve means.

2. In power transmissions and controls the combination of a planetary gear unit adapted to connect the drive of a power and a load shaft, said unit consisting of a power input ring gear, an output carrier and a reaction sun gear meshing with planet gears supported on said carrier, said planet gears meshing with said ring gear, a reaction brake controlling the rotation of said sun gear arranged to prevent backward rotation thereof during intervals when torque is being delivered from said power shaft to said load shaft and arranged to permit idling forward rotation of said sun gear during intervals of overtaking torque of said load shaft, a friction clutch adapted to couple said carrier and said sun gear to establish direct drive, power operated mechanism for said clutch arranged to engage and hold same to provide said direct drive, a control for said mechanism effective to cause said clutch engagement or release, said reaction brake being automatically released by engagement of said clutch, a two-way locking reaction brake for said sun gear, power operated mechanism for applying said last-mentioned brake, a control for said brake applying mechanism coordinated for alternate operation thereof with respect to the effective engagement of said clutch as controlled by said clutch mechanism control, and an independent control for the power operated mechanism of said two-way reaction brake operative in one position to permit said alternate clutch-brake operation and in a second position to render such alternate operation ineffective while permitting said first-named reaction brake to be effective to control rotation of said sun gear.

3. In a power transmission, an engine shaft and an output shaft, a first planetary gear unit comprising a ring gear directly coupled to said engine shaft, a reaction sun gear and a drum, a one-way brake for preventing backward rotation of said sun gear and drum and for permitting forward rotation thereof, a second brake for preventing rotation of said sun gear and drum in either direction, a planet carrier, planet gears mounted for rotation on said carrier and meshing with said sun and ring gears, fluid pressure means for clutching said planet carrier and drum for transmitting drive through said unit at unitary speed, fluid pressure means for applying said second brake for reduced speed drive through said first unit, a second planetary gear unit having its input coupled to the output of said first unit and its output coupled to said output shaft, a source of fluid pressure, valve means for selectively coupling said second brake actuating means and said clutch actuating means to said source of fluid pressure, and manually controllable valve means for blocking said second brake actuating means from said source of fluid pressure irrespective of the setting of said first-mentioned valve means.

4. In a power transmission for motor vehicles, an engine shaft, an output shaft, a multiple step-ratio transmission assembly coupling said shafts and divided into two planetary units, one of said units embodying at least one one-way brake for drive through gearing and a fluid pressure actuated clutch for direct drive by said unit, the other of said units embodying a fluid pressure actuated brake for drive through gearing and a fluid pressure actuated clutch for direct drive by said unit, fluid pressure actuated means for holding said clutches engaged, fluid pressure actuated means for releasing said fluid pressure actuated brake, a pump for supplying fluid pressure, a fluid pressure line for delivering fluid pressure to said one unit clutch to engage said clutch, fluid pressure lines to said other unit clutch and brake to engage the clutch and disengage the brake of said other unit, and a manually operable valve for directing fluid pressure from said pump to said lines, said valve being adapted in one position to block off fluid pressure in the lines leading to both of said clutches and simultaneously to direct fluid pressure to said other unit brake to release said brake, in another position to block off fluid pressure in the lines leading to both of said clutches and to said other unit brake, and in a third position to cut off both clutch delivery lines and open the delivery lines to said other unit brake.

5. In a power transmission for motor vehicles, an engine shaft, an output shaft, a multiple step-ratio gear transmission coupling said shafts and divided into two planetary units, one of said units embodying a one-way locking device for establishing drive through the gearing of said unit, a fluid pressure actuated brake for establishing drive through said gearing and embodying a fluid pressure actuated clutch for establishing direct drive, the second of said units embodying a fluid pressure operated brake for establishing drive through the gearing of said second unit and a fluid pressure actuated clutch for establishing direct drive in said second unit, mechanism adapted to be fluid pressure actuated for holding said clutches engaged, fluid pressure operated means for said first unit brake and for said second unit brake, a pump for supplying fluid pressure, a fluid pressure line connected to said pump and having branches leading to said first unit clutch and to said brake fluid pressure operated means for said second unit in order to apply said clutch and release said brake, a second fluid pressure line leading to said first unit fluid pressure brake operating means for applying said brake, a fluid pressure line leading to said second unit clutch for applying same, a fluid pressure line leading to said second unit brake operating means for releasing same, a manually operable valve for directing fluid pressure from said pump to said lines, said valve being adapted in one position to supply fluid pressure to said second unit brake operating means to release same and simultaneously to cut off fluid pressure to both of said clutches and said first unit brake operating means, in another position to supply fluid pressure to said first unit fluid actuated brake operating means to apply same, to supply fluid pressure to said second unit brake operating means to release same and to cut off simultaneously both said clutches from said pump, and in a third position to supply fluid pressure to said first unit fluid pressure brake operating means to apply same and to supply fluid pressure to said second unit brake operated means to release same and to cut off simultaneously both clutches from said pump pressure, and a manually operable valve for blocking off said first unit brake operating means from the feed of said pump irrespective of the position of said first-mentioned manually operable valve.

6. In a power transmission, an engine shaft and a load shaft, a planetary gearing unit including a ring gear driven by said engine shaft, a reaction sun gear, a planet carrier, planet gears supported upon said carrier and meshing with said sun and ring gears, means connecting said carrier to said load shaft, a one-way brake for preventing backward rotation of said sun gear and for permitting forward rotation thereof, a second brake for preventing rotation of said sun gear in either direction, fluid pressure responsive means for clutching said planet carrier and sun gear for direct drive through said unit, fluid pressure responsive means for applying said second brake for reduced speed drive through said gear unit, a source of fluid pressure, valve means for selectively coupling said second brake actuating means and said clutch actuating means to said fluid pressure source, and additional valve means selectively operable for preventing actuation of said second brake actuating means irrespective of the setting of said first-mentioned valve means.

7. A power transmission drive mechanism having a power shaft and a load shaft, a planetary gearing unit, a fluid coupling unit adapted to transmit variable torque between said gearing unit and said load shaft, said fluid coupling unit including an impeller and a driven rotor, said planetary gearing unit including a ring gear driven by said power input shaft, a sun gear, a plurality of planet gears meshing with said ring gear and sun gear and a planet carrier connected to said impeller, means connecting said rotor to said load shaft, clutch means actuatable to connect said sun gear to said planet carrier for direct drive of said impeller, a one-way brake for preventing rotation of said sun gear in one direction when said clutch is disengaged and for permitting rotation of said sun gear in the opposite direction when said clutch is engaged, an additional brake selectively applicable for preventing rotation of said sun gear in both directions, a fluid pressure source, valve means for selectively coupling said additional brake and said clutch to said fluid pressure source, and additional valve means selectively operable for preventing actuation of said additional brake irrespective of the setting of said first-mentioned valve means.

8. In a vehicle transmission drive mechanism, a power input shaft, a power output shaft, a fluid coupling unit having a rotor operatively connected to said power output shaft and an impeller, a planetary gearing unit including a ring gear, a sun gear, a planet carrier and a plurality of planet gears supported upon said carrier and meshing with said ring and sun gears, means connecting said ring gear to said power input shaft, means connecting said impeller to said planet carrier, clutch means actuatable to connect said sun gear to said planet carrier for direct drive through said gearing unit, fluid pressure responsive clutch actuating means, a one-way brake for preventing reverse rotation of said sun gear when said clutch is disengaged and for permitting forward rotation of said sun gear when said clutch is engaged, an additional brake selectively actuatable for preventing both forward and reverse rotation of said sun gear, fluid pressure responsive means for actuating said brake, a source of fluid pressure, valve means for directing fluid pressure from said source to said clutch actuating means and to brake actuating means, and an additional manually controlled valve for selectively connecting said fluid pressure responsive brake actuating means to said fluid pressure source.

9. A vehicle power transmission drive mechanism having a power input shaft and a power output shaft, a fluid coupling unit having a rotor operatively connected to said power output shaft and an impeller, a planetary gearing unit for driving said impeller including a ring gear, a planet carrier, a plurality of planet gears and a sun gear, means operatively connecting said ring gear to said power input shaft, means connecting said planet carrier to said impeller, a one-way brake for preventing rotation of said sun gear in one direction and for permitting rotation of said sun gear in the opposite direction, a clutch for directly connecting said planet carrier to said sun gear, fluid pressure responsive actuating means for applying said clutch, said one-way brake effective to lock said sun gear against rotation under influence of power flow from said power input shaft to said ring gear for reduction drive of said impeller when said clutch is released and effective to release said sun gear under influence of power flow from said output shaft to said impeller for free-wheeling of said vehicle, said one-way brake also being effective to permit rotation of said sun gear and carrier as a unit when said clutch is engaged for direct drive of said impeller, a two-way brake for preventing both forward and reverse rotation of said sun gear, fluid pressure responsive means for actuating said two-way brake, a fluid pressure source, valve means for directing fluid pressure from said source to both said clutch and brake actuating means, and additional valve means selectively operable for preventing application of said two-way brake irrespective of the setting of said first-mentioned valve means.

10. In a power transmission, an engine shaft and an output shaft, a first planetary gearing unit having a power input gear directly coupled to said engine shaft, a reaction gear and drum, a one-way brake for preventing backward rotation of said reaction gear and drum and for permitting forward rotation thereof, a planet carrier, planet pinions mounted for rotation on said carrier and meshing with said power input and reaction gears, means for clutching said planet carrier and drum for transmitting drive through said unit at unitary speed, a second brake selectively operable for preventing any rotation of said drum and reaction gear irrespective of the action of said one-way brake, a second planetary gearing unit having its input coupled to the output of said first planetary gearing unit and its output coupled to said output shaft, a fluid pressure source, valve means for selectively coupling said second brake and said clutch to said fluid pressure source, and additional valve means selectively operable for preventing actuation of said second brake irrespective of the setting of said first-mentioned valve means.

11. In a power transmission, an engine shaft and a load shaft, a planetary gearing unit including a power input gear driven by said engine shaft, a reaction gear, a planet carrier, planet pinions supported upon said carrier and meshing with said power input and reaction gears, means connecting said carrier to said load shaft, a one-way brake for preventing backward rotation of said reaction gear and for permitting forward rotation thereof, a second brake for preventing rotation of said reaction gear in either direction, fluid pressure responsive means for clutching said planet carrier to said reaction gear for direct drive through said unit, fluid pressure responsive means for applying said second brake for drive other than direct drive through said gear unit, a source of fluid pressure, valve means for selectively coupling said second brake actuating means and said clutch actuating means to said fluid pressure source, and additional valve means selectively operable for preventing actuation of said second brake actuating means irrespective of the setting of said first-mentioned valve means.

MARK H. FRANK.

References Cited in the file of this patent

UNITED STATES PATENTS

| Number | Name | Date |
|---|---|---|
| 2,204,872 | Thompson | June 18, 1940 |
| 2,224,884 | Schneider | Dec. 17, 1940 |
| 2,270,536 | Lenning | Jan. 20, 1942 |
| 2,302,714 | Pollard | Nov. 24, 1942 |
| 2,348,763 | Syrovy | May 16, 1944 |
| 2,371,228 | Dodge | May 13, 1945 |
| 2,377,696 | Kelley | June 5, 1945 |
| 2,398,839 | Moffitt | Apr. 23, 1946 |
| 2,430,258 | Thompson | Nov. 4, 1947 |
| 2,437,517 | Greenlee | Mar. 9, 1948 |
| 2,505,171 | Churchill | Apr. 25, 1950 |
| 2,516,208 | Hasbany | July 25, 1950 |

FOREIGN PATENTS

| Number | Country | Date |
|---|---|---|
| 477,530 | Great Britain | Jan. 3, 1938 |